US010609711B1

(12) United States Patent
Ma et al.

(10) Patent No.: US 10,609,711 B1
(45) Date of Patent: Mar. 31, 2020

(54) TIME-REVERSAL SCALABILITY FOR HIGH NETWORK DENSIFICATION

(71) Applicant: Origin Wireless, Inc., Boston, MA (US)

(72) Inventors: Hang Ma, Greenbelt, MD (US); Yan Chen, ChengDu (CN); Feng Han, San Diego, CA (US); Zhung-Han Wu, Silver Spring, MD (US); Zoltan Safar, Ellicott City, MD (US); K. J. Ray Liu, Potomac, MD (US)

(73) Assignee: Origin Wireless, Inc., Greenbelt, MD (US)

( * ) Notice: Subject to any disclaimer, the term of this patent is extended or adjusted under 35 U.S.C. 154(b) by 514 days.

(21) Appl. No.: 15/061,059

(22) Filed: Mar. 4, 2016

Related U.S. Application Data

(60) Provisional application No. 62/128,574, filed on Mar. 5, 2015.

(51) Int. Cl.
H04W 72/04 (2009.01)
H04W 48/08 (2009.01)
H04W 4/02 (2018.01)

(52) U.S. Cl.
CPC ....... *H04W 72/0453* (2013.01); *H04W 4/023* (2013.01); *H04W 48/08* (2013.01); *H04W 72/0433* (2013.01)

(58) Field of Classification Search
CPC ............. H04W 16/02; H04W 72/0426; H04W 72/0473; H04W 72/087; H04W 4/023;
(Continued)

(56) References Cited

U.S. PATENT DOCUMENTS 2,933,702 A 4/1960 Bogert
3,767,855 A 10/1973 Ueno et al.
(Continued)

FOREIGN PATENT DOCUMENTS

EP 2 571 214 A1 11/2012
WO WO 2007/031088 3/2007
(Continued)

OTHER PUBLICATIONS

Abbasi-Moghadam, D. and V.T. Vakili, "A SIMO one-bit time reversal for UWB communication systems", EURASIP J. Wireless Comm. and Networking, 2012:113, 2012.
(Continued)

*Primary Examiner* — Michael Thier
*Assistant Examiner* — Prince A Mensah
(74) *Attorney, Agent, or Firm* — Fish & Richardson P.C.

(57) ABSTRACT

The predicted explosive growth in the number of wireless devices and mobile applications utilizing wireless networks makes it time for engineers to face the high network densification challenge where massive numbers of terminal devices (TDs) coexist and require both high-rate and low-latency wireless data transmissions. We describe a multiple access point (AP) Time-Reversal Division Multiple Access (TRDMA) downlink system that utilizes the natural spatial and temporal focusing properties of Time Reversal (TR) based communications, where the interference to unintended receivers is automatically at least partially mitigated. As a result, in some implementations, the TRDMA system can achieve full or nearly-full spectrum reuse without any coordination among APs. The performance of the TRDMA system is investigated in both an open access model where an AP is open to all the TDs and a closed access model where an AP is only open to specific TDs. It is shown that in the open access model, the TRDMA system can be easily
(Continued)

extended by adding more APs to fit various scenarios. In the closed access model, the TRDMA system is failure-robust such that the performance degradation caused by neighboring APs is graceful. Moreover, the packet delay of the TRDMA system can be much lower than that of the IEEE 802.11 based system.

28 Claims, 13 Drawing Sheets

(58) Field of Classification Search
CPC ............ H04W 48/08; H04W 72/0433; H04W 72/0453
See application file for complete search history.

(56) References Cited

U.S. PATENT DOCUMENTS

| | | | |
|---|---|---|---|
| 5,092,336 | A | 3/1992 | Fink |
| 5,155,742 | A | 10/1992 | Ariyavisitakul et al. |
| 5,428,999 | A | 7/1995 | Fink |
| 5,926,768 | A | 7/1999 | Lewiner et al. |
| 6,301,291 | B1 | 10/2001 | Rouphael et al. |
| 6,490,469 | B2 | 12/2002 | Candy |
| 6,862,326 | B1 | 3/2005 | Eran et al. |
| 7,362,815 | B2 | 4/2008 | Lindskog et al. |
| 7,440,766 | B1 | 10/2008 | Tuovinen et al. |
| 7,460,605 | B2 | 12/2008 | Candy et al. |
| 7,463,690 | B2 | 12/2008 | Candy et al. |
| 7,587,291 | B1 | 9/2009 | Sarvazyan et al. |
| 7,768,876 | B2 | 8/2010 | Dahl et al. |
| 8,195,112 | B1 | 6/2012 | Zhang et al. |
| 8,346,197 | B2 | 1/2013 | Huy et al. |
| 8,411,765 | B2 | 4/2013 | Smith et al. |
| 8,451,181 | B2 | 5/2013 | Huy et al. |
| 8,457,217 | B2 | 6/2013 | Huy et al. |
| 8,498,658 | B2 | 7/2013 | Smith et al. |
| 8,593,998 | B2 | 11/2013 | Huy et al. |
| 8,743,976 | B2 | 6/2014 | Smith et al. |
| 8,792,396 | B2 | 7/2014 | Huy et al. |
| 8,831,164 | B2 | 9/2014 | Lu |
| 9,226,304 | B2 | 12/2015 | Chen et al. |
| 9,313,020 | B2 | 4/2016 | Ma et al. |
| 2003/0036359 | A1* | 2/2003 | Dent ............... H04B 7/005 455/63.1 |
| 2003/0138053 | A1 | 7/2003 | Candy et al. |
| 2004/0156443 | A1 | 8/2004 | Dent |
| 2004/0233870 | A1* | 11/2004 | Willenegger ....... H04W 52/223 370/329 |
| 2006/0098746 | A1 | 5/2006 | Candy et al. |
| 2006/0115031 | A1 | 6/2006 | Lindskog et al. |
| 2010/0240409 | A1* | 9/2010 | Muraoka ............ H04L 1/20 455/522 |
| 2010/0302977 | A1 | 12/2010 | Huy et al. |
| 2010/0309829 | A1 | 12/2010 | Huy et al. |
| 2011/0170466 | A1* | 7/2011 | Kwun ............. H04W 52/0235 370/311 |
| 2012/0033571 | A1* | 2/2012 | Shimezawa ......... H04B 7/026 370/252 |
| 2012/0155515 | A1 | 6/2012 | Smith et al. |
| 2012/0183037 | A1 | 7/2012 | Allpress et al. |
| 2012/0207234 | A1 | 8/2012 | De Rosny et al. |
| 2012/0257660 | A1* | 10/2012 | Smith ............... H04L 25/0212 375/224 |
| 2012/0263056 | A1 | 10/2012 | Smith et al. |
| 2012/0328037 | A1 | 12/2012 | Hsu et al. |
| 2013/0053039 | A1* | 2/2013 | Jorguseski ........... H04W 24/02 455/436 |
| 2013/0201958 | A1 | 8/2013 | Huy et al. |
| 2013/0223317 | A1* | 8/2013 | Kudo ............. H04W 52/0206 370/311 |
| 2013/0223503 | A1 | 8/2013 | Smith et al. |
| 2013/0252660 | A1* | 9/2013 | Bach ............. H04W 52/0206 455/525 |
| 2014/0004845 | A1* | 1/2014 | Marque-Pucheu ............... H04W 52/244 455/422.1 |
| 2014/0022128 | A1 | 1/2014 | Smith |
| 2014/0126567 | A1 | 5/2014 | Husain et al. |
| 2014/0185596 | A1 | 7/2014 | Han et al. |
| 2014/0370930 | A1* | 12/2014 | Kurokochi ............ H04W 16/32 455/522 |
| 2015/0049745 | A1 | 2/2015 | Han et al. |
| 2015/0049792 | A1 | 2/2015 | Han et al. |
| 2015/0095493 | A1* | 4/2015 | Xu .................. H04B 3/542 709/225 |
| 2015/0312081 | A1 | 10/2015 | Yang et al. |
| 2016/0018508 | A1 | 1/2016 | Chen et al. |
| 2016/0021670 | A1 | 1/2016 | Yang et al. |
| 2016/0057708 | A1* | 2/2016 | Siomina ............. H04W 52/243 455/452.2 |
| 2016/0353299 | A1* | 12/2016 | Sayeed ................ H04W 24/08 |

FOREIGN PATENT DOCUMENTS

| | | |
|---|---|---|
| WO | WO 2011/029072 | 3/2011 |
| WO | WO 2011/029075 | 3/2011 |
| WO | WO 2012/151316 | 11/2012 |
| WO | WO 2013/126054 | 8/2013 |

OTHER PUBLICATIONS

Albert, D., L. Liu, M. L. Moran, "Time Reversal processing for source location in an urban environment (L)", J. Acoust. Soc. Am., vol. 118, No. 2, pp. 616-619, Aug. 2005.

Brysev, A.P., L.M. Krutyanskii, V'L. Preobrazhenskii, "Wave Phase Conjugation in ultrasonic beams", Physics-Uspekhi, vol. 41, No. 8, pp. 793-805, 1998.

Chang, Y.H., S.H. Tsai, X. Yu, C.C. J. Kuo, "Ultrawideband Transceiver Design Using Channel Phase Precoding", IEEE Trans. Sig. Proc., vol. 55, No. 7, pp. 3807-3822, Jul. 2007.

Chen, Y. et al., "Time-reversal wideband communications," IEEE Signal Processing Letters, vol. 20(12):1219-1222 (Dec. 2013).

Chen, Y., F. Han, Y.H. Yang, H. Ma, Y. Han, C. Jiang, H.Q. Lai, D. Claffey, Z. Safar, K.J.R. Liu, "Time-Reversal Wireless Paradigm for Green Internet of Things: An Overview", IEEE Internet of Things Journal, vol. 1, No. 1, Feb. 2014.

Daniels et al., "Improving on Time-reversal with MISO Precoding," Proceedings of the Eighth International Symposium on Wireless Personal Communications Conference, Aalborg, Denmark, 5 pages, 2005.

Daniels, R.C. and R. W. Heath, "MISO precoding for temporal and spatial focusing" in the Proceedings of the Eighth International Symposium on Wireless Personal Communications Conference, Aalborg, Denmark, 2005.

De Rosny, J., G. Lerosey and M. Fink, "Theory of Electromagnetic Time-Reversal Mirrors", IEEE Trans. Antennas Propag., vol. 58, No. 10, pp. 3139-3149, Oct. 2010.

Derode, A., A. Tourin, and M. Fink, "Ultrasonic pulse compression with one-bit time reversal through multiple scattering", J. Appl. Phys., vol. 85, No. 9, pp. 6343-6352, May 1999.

Derode, A., A. Tourin, J. de Rosny, M. Tanter, S. Yon, and M. Fink, "Taking Advantage of Multiple Scattering to Communicate with Time-Reversal Antennas", Phys. Rev. Lett., vol. 90, No. 1, 014301, Jan. 2003.

Derode, A., P. Roux, and M. Fink, "Robust Acoustic Time Reversal and High-Order Multiple Scattering", Phys. Rev. Lett., vol. 75, No. 23, pp. 4206-4210, Dec. 1995.

Dorme, C. and M. Fink, "Focusing in transmit-receive mode through inhomogeneous media: The time reversal matched filter approach", J. Acoust. Soc. Am., vol. 98, Pt. 1, pp. 1155-1162, Aug. 1995.

Edelmann, G.F., Akal, T., Hodgkiss, W. S., Kim, S., Kuperman, W. A., Song, H. C., "An Initial Demonstration of Underwater Acoustic Communication Using Time Reversal", IEEE Journal of Oceanic Engineering, vol. 27, No. 3, Jul. 2002.

(56) References Cited

OTHER PUBLICATIONS

Emami et al., "Matched Filtering with Rate Back-off for Low Complexity Communications in Very Large Delay Spread Channels," 38th Asilomar Conference on Signals, Systems and Computers, pp. 218-222, 2004.
Emami, S.M., J. Hansen, A.D. Kim, G. Papanicolaou, A.J. Paulraj, D. Cheung, C. Prettie, "Predicted Time Reversal Performance in Wireless Communications using Channel Measurements", publication details unknown.
Fink, M. and C. Prada, "Acoustic Time-Reversal Mirrors", Inverse Problems, vol. 17, pp. R1-R38, 2001.
Fink, M., "Time Reversal of Ultrasonic Fields—Part I: Basic Principals", IEEE Trans. Ultrasonics, Ferroelectrics and Freq. Contr., vol. 39, No. 5, pp. 555-566, Sep. 1992.
Fink, M., "Time-Reversal Mirrors", J. Phys. D: Appl. Phys., vol. 26, pp. 1333-1350, 1993.
Fink, M., "Time-Reversed Acoustics", Scientific American, pp. 91-97, Nov. 1999.
Fink, M., C. Prada, F. Wu, and D. Cassereau, "Self focusing in inhomogeneous media with time reversal acoustic mirrors," IEEE Ultrasonics Symposium, vol. 1, pp. 681-686, 1989.
Fontana, R.J., S.J. Gunderson, "Ultra-Wideband Precision Asset Location System", Proc. of the IEEE Conf. on UWB Sys. and Tech., pp. 147-150, 2002.
Guo, N., B.M. Sadler and R.C. Qiu, "Reduced-Complexity UWB Time-Reversal Techniques and Experimental Results", IEEE Trans. On Wireless Comm., vol. 6, No. 12, Dec. 2007.
Han, F. and K.J.R. Liu, "A multiuser TRDMA uplink system with 2D parallel interference cancellation," IEEE Transactions on Communications, vol. 62(3):1011-1022 (Mar. 2014).
Han, F. and K.J.R. Liu, "An Interference Cancellation Scheme for the Multiuser TRDMA Uplink System," Global Telecommunications Conference, pp. 3583-3588 (2013).
Han, F., "Energy Efficient Optimization in Green Wireless Networks", University of Maryland Ph.D. Dissertation, 2013.
Han, F., Yang, Y.-H., Wang, B., Wu, Y., Liu, K.J.R., "Time-reversal division multiple access in multi-path channels", IEEE Globecom, Houston, Dec. 2011.
Han, F., Yang, Y-H., Wang, B., Y. Wu, K.J.R. Liu, "Time-reversal division multiple access over multi-path channels", IEEE Trans. On Communications, vol. 60:1953-1965, Jul. 2012.
Han, Y., Chen, Y., and Liu, K.J.R, 'Time-Reversal with Limited Signature Precision: Tradeoff Between Complexity and Performance', Proc IEEE Global Conference on Signal and Information Processing (GlobalSIP), Atlanta, Dec. 2014.
Henty, B.E. and D.D. Stancil, "Multipath-Enabled Super-Resolution for rf and Microwave Communication using Phase-Conjugate Arrays", Phys. Rev. Lett., vol. 93, 243904, Dec. 2004.
Jin, Y., Moura, J., "Time-Reversal Detection Using Antenna Arrays", IEEE Trans. Signal Processing, vol. 57(4):1396-1414, Apr. 2009.
Jin, Y. et al., "Adaptive time reversal beamforming in dense multipath communication networks," 2008 42nd Asilomar Conference on Signals, Systems and Computers, pp. 2027-2031 (Oct. 2008).
Khalegi, A., G. El Zein and I. Navqi, "Demonstration of Time-Reversal in Indoor Ultra-Wideband Communication: Time Domain Measurement", IEEE Proc. of ISWCS, pp. 465-468, 2007.
Kuperman, W.A., W.S. Hodgkiss, H.C. Song, T. Akal, C. Ferla, D.R. Jackson, "Phase conjugation in the ocean: Experimental demonstration of an acoustic time-reversal mirror", J. Acoust. Soc. Am., vol. 103, No. 1, pp. 25-40, Jan. 1998.
Kyritsi, P. and G. Papanicolau, "One-bit Time Reversal for WLAN Applications", IEEE 16th Intern. Symp. On Personal, Indoor and Mobile Radio Comm., pp. 532-536, 2005.
Kyritsi, P. et al., "Time reversal and zero-forcing equalization for fixed wireless access channels," 39th Asilomar Conference on Signals, Systems and Computers, pp. 1297-1301 (2005).
Kyritsi, P. et al., "Time reversal techniques for wireless communications," IEEE Vehicular Technology Conference, vol. 1:47-51 (2004).
Lemoult, F., G. Lerosey, J. de Rosny, and M. Fink, "Manipulating Spatiotemporal Degrees of Freedom in Waves of Random Media", Phys. Rev. Lett., vol. 103, 173902, Oct. 2009.
Lemoult, F., G. Lerosey, J. de Rosny, and M. Fink, "Resonant Metalenses for Breaking the Diffraction Barrier", Phys. Rev. Lett., vol. 104, 203901, May 2010.
Lerosey, G., J. de Rosny, A. Tourin, A. Derode, G. Montaldo and M. Fink, "Time Reversal of Electromagnetic Waves and Telecommunication", Radio Science, vol. 40, RS6S12, 2005.
Lerosey, G., J. de Rosny, A. Tourin, A. Derode, G. Montaldo and M. Fink, "Time Reversal of Electromagnetic Waves", Phys. Rev. Lett., vol. 92, No. 19, 193904, May 2004.
Lerosey, G., J. de Rosny, A. Tourin, A. Derode, M. Fink, "Time Reversal of Wideband Microwaves", Appl. Phys. Lett., vol. 88, 154101, Apr. 2006.
Lerosey, G. J. de Rosny, A. Tourin, and M. Fink, "Focusing beyond the diffraction limit with far-field time reversal", Science, vol. 315, pp. 1120-1122, Feb. 2007.
Lienard, M. et al., "Focusing gain model of time-reversed signals in dense multipath channels," IEEE Antennas and Wireless Propagation Letters, vol. 11:1064-1067 ( 2012).
Ma, H., F. Han, and K.J.R. Liu, "Interference-Mitigating Broadband Secondary User Downlink System: A Time-Reversal Solution", Global Telecommunications Conference, pp. 884-889, (2013).
Montaldo, G., Lerosey, G., Derode, A., Tourin, A., de Rosny, J., Fink, M., "Telecommunication in a disordered environment with iterative time reversal", Waves Random Media, vol. 14:287-302, 2004.
Moura, J.M.F. and Y. Jin, "Detection by Time Reversal: Single Antenna", IEEE Trans. On Signal Process., vol. 55, No. 1, Jan. 2007.
Moura, J.M.F. and Y. Jin, "Time Reversal Imaging by Adaptive Interference Canceling", IEEE Trans. On Signal Process., vol. 56, No. 1, Jan. 2008.
Naqvi, I.H., A. Khaleghi and G. El Zein, "Performance Enhancement of Multiuser Time Reversal UWB Communication System", Proc. of IEEE ISWCS, pp. 567-571, 2007.
Naqvi, I.H., G. El Zein, G. Lerosey, J. de Rosny, P. Besnier, A. Tourin, M. Fink, "Experimental validation of time reversal ultra wide-band communication system for high data rates", IET Microw. Antennas Propag., vol. 4, Iss. 5, pp. 643-650, 2010.
Naqvi, I.H., P. Besnier and G. El Zein, "Effects of Time Variant Channel on a Time Reversal UWB System", Global Telecommunications Conference, (2009).
Nguyen, H. T., "On the performance of one bit time reversal for multi-user wireless communications", IEEE Proc. of ISWCS, pp. 672-676, 2007.
Nguyen, H., F. Zheng, and T. Kaiser, "Antenna Selection for Time Reversal MIMO UWB Systems", IEEE Vehicle Technology Conference, pp. 1-5, 2009.
Nguyen, H., Z. Zhao, F. Zheng and T. Kaiser, "On the MSI Mitigation for MIMO UWB Time Reversal Systems", Proc. of IEEE International Conference on Ultra-Wideband, pp. 295-299, 2009.
Nguyen, H., Z. Zhao, F. Zheng, and T. Kaiser, "Preequalizer Design for Spatial Multiplexing SIMO-UWB TR Systems", IEEE Trans. On Vehicular Tech., vol. 59, No. 8, Oct. 2010.
Nguyen, H.T., "Partial one bit time reversal for UWB impulse radio multi-user communications", IEEE Proc. of ICCE, 2008.
Nguyen, H.T., Kovacs, I.Z., Eggers, P.C.F., "A time reversal transmission approach for multiuser UWB communications", IEEE Trans. Antennas and Propagation, vol. 54(11):3216-3224, Nov. 2006.
Nguyen, T.K., H. Nguyen, F. Zheng and T. Kaiser, "Spatial Correlation in SM-MIMO-UWB Systems Using a Pre-Equalizer and Pre-Rake Filter", Proc. of IEEE International Conference on Ultra-Wideband, pp. 1-4, 2010.
Nguyen, T.K., H. Nguyen, F. Zheng, and T. Kaiser, "Spatial Correlation in the Broadcast MU-MIMO UWB System Using a Pre-Equalizer and Time Reversal Pre-Filter", Proc. of IEEE ICPCS, 2010.

(56) References Cited

OTHER PUBLICATIONS

Oestges, C., A.D. Kim, G. Papanicolaou, and A.J. Paulraj, "Characterization of Space-Time Focusing in Time Reversed Random Fields", IEEE Trans. Antennas and Propag., pp. 1-9, 2005.
Parvulescu, A. and Clay, C. S., "Reproducibility of Signal Transmissions in the Ocean", The Radio and Electronic Engineer, pp. 223-228, Apr. 1965.
Phan-Huy, D. T., S.B. Halima, M. Helard, "Frequency Division Duplex Time Reversal", Global Telecommunications Conference, (2011).
Pitarokoilis, A., Mohammed, S. K., Larsson, E.G., "Uplink performance of time-reversal MRC in massive MIMO systems subject to phase noise", IEEE Trans. Wireless Communications, pp. 711-723, Sep. 2014.
Porcino, D., "Ultra-Wideband Radio Technology: Potential and Challenges Ahead", IEEE Communications Mag., pp. 66-74, Jul. 2003.
Prada, C., F. Wu, and M. Fink, "The iterative time reversal mirror: A solution to self-focusing in the pulse echo mode," J. Acoustic Society of America, vol. 90, pp. 1119-1129, 1991.
Price, R., "A Communication Technique for Multipath Channels", Proceeding of the IRE, pp. 555-570, 1958.
Qiu, R. C. et al., "Time reversal with miso for ultra-wideband communications: Experimental results," IEEE Antenna and Wireless Propagation Letters, vol. 5:269-273 (2006).
Rode, J. P., M.J. Hsu, D. Smith and A. Hussain, "Collaborative Beamfocusing Radio (COBRA)", Proc. of SPIE, vol. 8753, pp. 87530J-1-11, 2013.
Rouseff, D., D.R. Jackson, W.L.J. Fox, C.D. Jones, J.A. Ritcey, and D.R. Dowling, "Underwater Acoustic Communication by Passive-Phase Conjugation: Theory and Experimental Results", IEEE J. Oceanic Eng., vol. 26, No. 4, pp. 821-831, Oct. 2001.
Saghir, H., M. Heddebaut, F. Elbahhar, A. Rivenq, J.M. Rouvaen, "Time-Reversal UWB Wireless Communication-Based Train Control in Tunnel", J. of Comm., vol. 4, No. 4, pp. 248-256, May 2009.
Song, H. C., W.A. Kuperman, W.S. Hodgkiss, T. Akal, and C. Ferla, "Iterative time reversal on the ocean", J. Acoust. Soc. Am, vol. 105, No. 6, pp. 3176-3184, Jun. 1999.
Song, H. C., W.S. Hodgkiss, W.A. Kuperman, T. Akal, and M. Stevenson, "Multiuser Communications Using Passive Time Reversal", IEEE J. Oceanic Eng., vol. 32, No. 4, pp. 915-926, Oct. 2007.
Strohmer, T., M. Emami, J. Hansen, G. Papanicolaou and A.J. Paulraj, "Application of Time-Reversal with MMSE Equalizer to UWB Communications", Global Telecommunications Conference, pp. 3123-3127, (2004).
Viteri-Mera, C. A., Teixeira, F. L., "Interference-Nulling Time-Reversal Beamforming for mm-Wave Massive MIMO in Multi-User Frequency-Selective Indoor Channels", arXiv:1506.05143[cs.IT], Jun. 18, 2015.
Wang, B. et al., "Green wireless communications: A time-reversal paradigm," IEEE Journal of Selected Areas in Communications, vol. 29:1698-1710 (2011).
Wu, F., J.L. Thomas, and M. Fink, "Time Reversal of Ultrasonic Fields—Part II: Experimental Results", IEEE Trans. Ultrasonics, Ferroelectrics and Freq. Contr., vol. 39, No. 5, pp. 567-578, Sep. 1992.
Wu, Z.H., Han, Y., Chen, Y., and Liu, K.J.R., "A Time-Reversal Paradigm for Indoor Positioning System", IEEE Transactions on Vehicular Technology, vol. 64(4):1331-1339, special section on Indoor localization, tracking, and mapping with heterogeneous technologies, Apr. 2015.
Xiao, S. Q., J. Chen, B.Z. Wang, and X.F. Liu, "A Numerical Study on Time-Reversal Electromagnetic Wave for Indoor Ultra-Wideband Signal Transmission", Progress in Electromagnetics Research, PIER 77, pp. 329-342, 2007.
Yang, Y. H., "Waveform Design and Network Selection in Wideband Small Cell Networks", University of Maryland Ph. D. Thesis, 2013.
Yang, Y. H., B. Wang and K.J.R. Liu, "Waveform Design for Sum Rate Optimization in Time-Reversal Multiuser Downlink Systems", Global Telecommunications Conference, (2011).
Yang, Y-H, Wang, B., Lin, W.S., Liu, K.J.R., "Near-Optimal Waveform Design for Sum Rate Optimization in Time-Reversal Multiuser Downlink Systems", IEEE Trans Wireless Communications, vol. 12(1):346-357, Jan. 2013.
Yang, Yu-Han et al., "Waveform Design for Time-Reversal Systems", U.S. Appl. No. 13/706,342, filed Dec. 5, 2012, 86 pages).
Zhou, X., P.C.F. Eggers, P. Kyritsi, J.B. Andersen, G.F. Pedersen and J.O. Nilsen, "Spatial Focusing and Interference Reduction using MISO Time Reversal in an Indoor Application", IEEE Proc. of SSP, pp. 307-311, 2007.

\* cited by examiner

TIME-REVERSAL SCALABILITY FOR HIGH NETWORK DENSIFICATION

CROSS REFERENCE TO RELATED APPLICATIONS

Pursuant to 35 USC § 119(e), this application claims the benefit of prior U.S. Provisional Patent Application 62/128,574, filed on Mar. 5, 2015. The above application is incorporated by reference in its entirety.

TECHNICAL FIELD

This disclosure generally relates to time-reversal technologies that can be used for communication, location determination, and gesture recognition systems. This disclosure describes embodiments operating in the radio frequency range of the electromagnetic spectrum, but other operating frequencies are possible and are within the scope of the invention.

BACKGROUND

The demand for high-speed and low-latency wireless communication capabilities has increased dramatically in recent years. It has been projected that by the year 2020, the volume of wireless traffic will rise to about one thousand (1000) times that of the year 2010. Supporting these traffic demands will be a challenge for future wireless networks. One challenge will be supporting the huge number of wireless devices with ever-growing demands for higher data rates within the allocated spectrum. Another will be the scheduling delay that is expected to accompany large numbers of coexisting wireless devices competing for network service and to significantly deteriorate the user experience in many delay-sensitive applications. Some network users have already started to feel the impact of such delays in places such as airports, conference halls, and stadiums where it is difficult to access the wireless network with hundreds of other devices operating concurrently. Such poor user experiences may become the norm if new technologies are not introduced to deal with the predicted growth of wireless traffic, including the Internet of Things (IoT).

Several technologies have been proposed to tackle this challenge. One straightforward approach is to install more access points (APs) in a given coverage area such that each AP can service a smaller number of users or terminal devices (TDs) and therefore more traffic can be offloaded to the wired backhaul networks. However, APs that utilize the widely adopted and deployed OFDM protocols can interfer with each other when they are deployed too close together. Sophisticated interference mitigation and resource allocation algorithms may be used to enable the closely spaced APs to accommodate multiple users. For instance, in the IEEE 802.11 (WiFi) standard, the overall available spectrum is 72 MHz in the 2.4 GHz band but adjacent APs may be restricted to utilizing 22 MHz or less of the available spectrum because they may each need to operate in different spectral bands to reduce interference with each other and with the TDs. But this kind of frequency division multiplexing may hinder closely-spaced APs from fully utilizing the available spectrum and therefore supporting the predicted user demands of the future. Moreover, in such schemes, channel planning can be time-consuming and may fail altogether, either because of a lack of communication among multiple APs, or a lack of enough independent spectral bands to support the traffic demands. The system may suffer when APs are added or removed from the network because the channel planning may need to be done all over again. Femtocell networks may suffer from similar issues since the interference between macro- and femto-base stations or among multiple femto-base stations need to be coordinated and mitigated by division of the network resources, that is reducing the spectral allocation to individual users or cells. Therefore, while installing more orthogonal frequency-divisional multiplexing (OFDM) (or similar existing protocol) based access points in a given wireless coverage area may be straightforward and a suitable solution for some applications, this solution alone does not appear to scale well enough to meet the predicted growth in traffic demands of future wireless network capabilities.

Another possible approach is to use multiple-input-multiple-output (MIMO) techniques such as have been incorporated in some existing OFDM based schemes such as WiFi and LTE (Long Term Evolution) to improve the spectral efficiency and/or reduce the scheduling delay of wireless networks. For example, multi-user multiple-input-multiple-output (MU-MIMO) techniques are able to support multiple simultaneous transmissions. However, in addition to the difficulty in operating multiple antennas, the number of supported simultaneous transmissions is limited. Therefore, this solution alone may not be sufficient for the high network densification challenge described above. Recently, researchers have begun to investigate so-called massive MIMO techniques that use many more antennas than active terminals so that the extra antennas can help focus the wireless signal energy into smaller regions and support some level of spatial multiplexing in addition to frequency multiplexing. While the massive MIMO technique brings some unique benefits beyond the traditional MIMO system, the cost and complexity of implementing these schemes may scale up with the number of antennas, which may hinder it from being widely adopted. The principle of utilizing extra antennas also can be applied in distributed antenna systems where some additional antennas are placed close to the users. The wireless signal energy can then be focused into a small area through the coordination of the local antennas and thus the system may be able to provide high data rates for certain terminal devices. However, the complexity of the system and of coordinating the antennas grows with the system size, which may limit the scalability of this solution.

SUMMARY OF THE INVENTION

Time-reversal (TR) communication systems have the features of spatial and temporal focusing such that wireless signal power can be naturally focused at intended devices in a network while creating very little leakage of signals (interference) to unintended devices or the surroundings. This focusing can be realized in systems where channel reciprocity and stationarity are fairly well maintained. For example, in time-reversal communication systems, an intended device may send a probe signal to a data transceiver such as an access point. The access point may receive the probe signal, which, because of signal scattering sites and reflectors in the environment, may have traveled over many physical paths to reach the access point. That is, the access point may receive a multipath signal from the intended device. Based on this received multipath signal, the access point may estimate the channel impulse response for the channel between the intended device and itself. Then, the access point may generate a time-reversed version of the channel impulse response that can be used as a carrier waveform for sending data back to the intended device.

When the access point transmits data modulated onto the time-reversed waveform, the time-reversal waveform may retrace the multiple paths between the access point and the intended device and form a constructive sum of signals at the intended location, resulting in a peak in the signal-power distribution over the space, which is referred to as the spatial focusing effect. Because time-reversal may use the multi-paths as a matched filter, the transmitted signal may be focused in the time domain as well, which is referred to as the temporal focusing effect.

These focusing features may be key to tackling the high network densification challenge. For example, a very attractive aspect of time-reversal systems is that they take advantage of "natural" location-specific signatures generated for multiple users and use the environment as a matched filter to perform near-perfect deconvolution of data signals at the intended receivers, yielding the benefits of large bandwidth communications channels and high-accuracy, high-density spatial multiplexing with very low computational complexity. In some examples, these can be achieved with a single antenna at a terminal device and access point. In some examples, multiple antennas may also be used to further improve performance, but the relative numbers of antennas at access points and terminal devices are much smaller than what is proposed for MIMO systems, much less massive MIMO systems. Due to the ability to naturally separate signals transmitted between multiple devices in both uplink and downlink, TR techniques do scale well enough to meet the predicted growth in demand of wireless network capabilities, even for very high user densities, such as those associated with the IoT, for example. In this disclosure, we describe time-reversal systems, components, methods and techniques that may be used to meet the demands of wireless networking. These time-reversal systems, components, methods and techniques may be used alone or in combination with the OFDM, Wi-Fi, LTE, MIMO and other antenna systems, components, methods and techniques described above.

TR communications take advantage of spatial and temporal focusing effects associated with the unique location-specific signatures of APs and TDs in a wireless network such that properly constructed transmission signals may be focused at the intended receivers with little or reduced interference to other receivers, even when unintended receivers are very close to the transmitter and/or the intended receivers. Such focusing effects can also be described as a resonating phenomenon of the multi-path environment and these effects enable systems with high-precision spatial multiplexing that is location specific and not distance-based, as in the case with spatially multiplexed wireless cells or cellular networks. That is, in traditional communication systems where the signal and interference powers mainly depend on the distance between users and/or access points, the concept of cells has been used to spatially and frequency multiplex near-by groups of users to avoid strong interference with signals intended for other near-by groups of users. In some implementations, cell architectures may not be needed in TR-based communication schemes because the interference power is automatically reduced enough that full-spectrum or nearly-full-spectrum reuse can be efficiently achieved. Therefore, the high network densification challenge can be addressed using time-reversal division multiple access (TRDMA) systems. The TRDMA systems can have one or more of the advantages summarized below.

1. A TR-based downlink system can leverage the spatial focusing feature of TR communications to deliver data to large numbers of devices. Different from traditional approaches where the coverage area is divided into multiple cells to avoid interference, the proposed system does not have the notion of cells since all users share the same spectrum and the signal power is naturally focused at the intended user with little interference to other locations. As a result, resource division or coordination among APs is minimized so that it is easy to set up and the scale of the system is not constrained by the difficulty of coordination among APs.

2. Two access models can be used: the open access model where an AP is open to all the TDs, and the closed access model where an AP is only open to specific TDs. We analyze the achievable data rate of the TRDMA system using the Poisson Point Process (PPP) location model to characterize the chaotic and nomadic deployment of the APs and TDs to show performance of exemplary systems.

3. We show that, compared with IEEE 802.11 based system, the TRDMA system is scalable, failure-robust, and low-latency. In the open access case, the TRDMA system could be easily extended to serve higher user density and/or higher data rate by adding extra APs independently with little to no additional coordination. On the other hand, in the closed access case, each TD suffers less from neighboring APs since each link does not require exclusive use of the channel, and the interference power is automatically mitigated. Moreover, it is shown that the packet delay in the TRDMA system is lower than that in the IEEE 802.11 based system since the transmission of a packet does not depend on the behavior of other devices.

In a general aspect, a wireless access point includes a wireless transmitter; and a processor that is configured to generate designed waveforms, and generate downlink waveforms based on a combination of the designed waveforms and downlink data, such that the downlink waveforms are spatially focused at intended receivers. The wireless transmitter transmits the downlink waveforms to the receivers. Each designed waveform is associated with a particular receiver, the designed waveform is designed based on information about characteristics of a multipath channel between the wireless transmitter and the particular receiver, and a downlink waveform that is generated based on the designed waveform and downlink data intended for the particular receiver is spatially focused at the particular receiver. The wireless transmitter transmits in a first frequency band that overlaps a second frequency band of a neighboring access point.

In another general aspect, a wireless access point includes a wireless receiver for receiving wireless channel probe signals and uplink data signals; a processor that is configured to determine channel response estimates from the probe signal and process the uplink data signals to configure a control signal based on the uplink data signals; and a first activation switch to activate or de-activate the wireless access point or a circuit in the wireless access point. The processor is configured to use the control signal to control the first activation switch of the wireless access point or a second activation switch of another access point.

In another general aspect, a wireless access point includes a wireless transmitter; and a processor that is configured to generate designed waveforms, and generate downlink waveforms based on a combination of the designed waveforms and downlink data, such that the downlink waveforms are spatially and temporally focused at intended receivers. The wireless transmitter transmits the downlink waveforms to the receivers. Each designed waveform is associated with a particular receiver, the designed waveform is designed based on information about characteristics of a multipath channel between the wireless transmitter and the particular receiver, and a downlink waveform that is generated based on the designed waveform and downlink data intended for the particular receiver is spatially and temporally focused at the particular receiver. The wireless transmitter transmits in a first frequency band that overlaps a second frequency band of a closest neighboring access point.

Other aspects include other combinations of the features recited above and other features, expressed as methods, apparatus, systems, program products, and in other ways.

Unless otherwise defined, all technical and scientific terms used herein have the same meaning as commonly understood by one of ordinary skill in the art to which this invention belongs. In case of conflict with patent applications incorporated herein by reference, the present specification, including definitions, will control.

In this description, the term "user" may refer to a device. For example, in a system that has multiple devices communicating with a base station or access point, the term "multi-user uplink" may refer to the uplink from multiple devices or from a device with multiple antennas, the term "multi-user downlink" may refer to the downlink to multiple devices or to a device with multiple antennas, and the term "inter-user interference" may refer to the interference among various devices.

In this description, wireless signals may propagate between two devices. In some embodiments, one device may be referred to as a base station, an access point, a locator, a transmitter, a receiver, a transceiver, a source, a router, a time reversal machine, an origin, a time-reversal origin, and the like. In some embodiments, one device may be referred to as a user, a terminal device, a bot, a time-reversal bot, a mobile device, a phone, a computer, a tablet, a wearable electronic device such as a watch, a band, a wristband, an ankle band, a belt, a sensor, a piece of clothing and the like, an electronic card, fob, dongle, and the like, a "pinger", a transmitter, a receiver, a transceiver, a device, and the like. In some embodiments, the described roles of one device may be exchanged with the described roles of the other device. In embodiments described as having two devices, or an access point and a terminal device, or similar descriptions, it should be understood that those embodiments may also include more than two devices. For example, embodiments described as having an access point and a device may have multiple devices and/or may have multiple access points. Likewise, embodiments may have multiple base stations, locators, routers, transceivers, sources, transmitters, receivers, mobile devices, phones, tablets, computers, wearable electronic components, cards, fobs, dongles, pingers, devices, time-reversal machines, time-reversal bots, and the like.

BRIEF DESCRIPTION OF THE DRAWINGS

FIG. 1 shows an exemplary wireless system comprising access points (APs) and terminal devices (TDs) or users such as phones, computers, printers and the like.

Like reference symbols in the various drawings indicate like elements.

DETAILED DESCRIPTION

Figure 1:
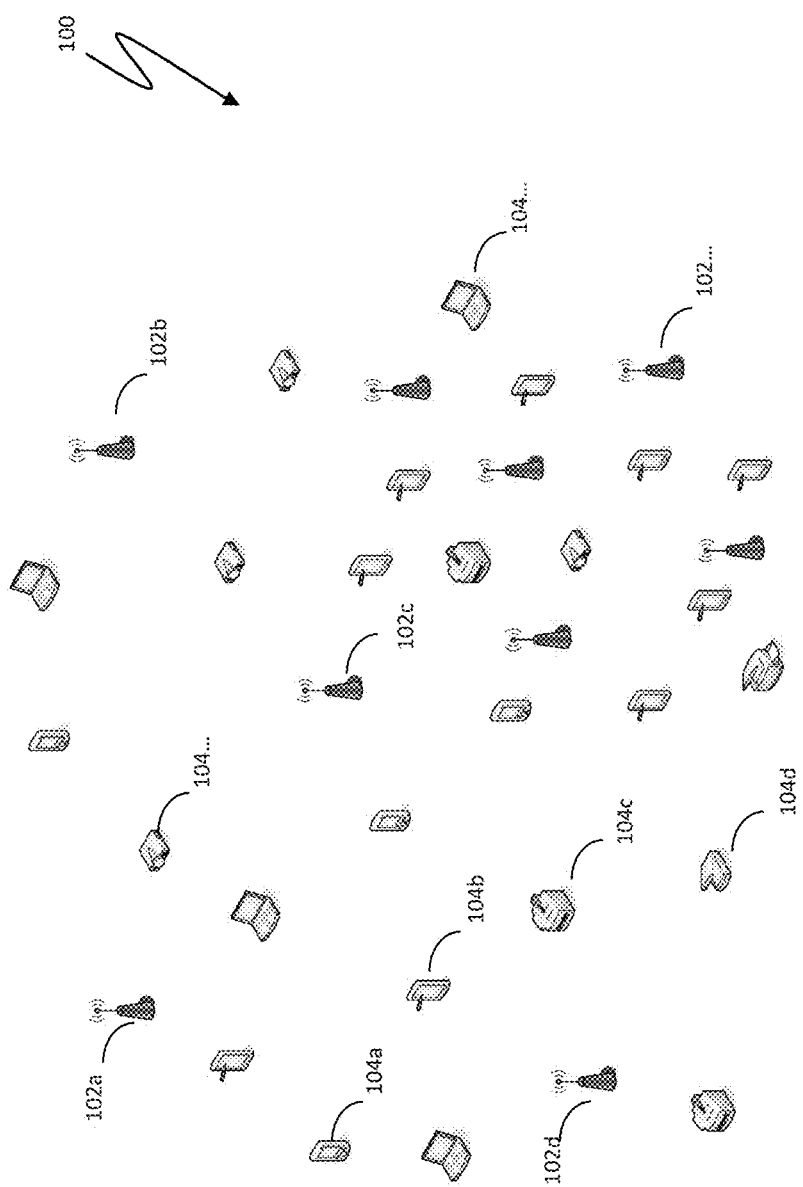

In this disclosure we describe exemplary embodiments of systems that can efficiently deliver data wirelessly to large numbers of terminal devices (TDs) 100. The time-reversal division multiple access (TRDMA) systems may include a single or multiple access points (APs) that work under a TRDMA scheme. As shown in FIG. 1, multiple APs 102 can be distributed in an area to accommodate multiple various TDs 104. In exemplary embodiments there may be little or no coordination among the APs 102 and each TD 104 may be served by only one AP 102a at a time with the signals received from other APs, e.g., 102b, 102c, 102d, regarded as interference. In other exemplary embodiments, there may be coordination among the APs 102 and the TDs 104 may be able to distinguish a signal from one AP 102b from a signal from another AP 102c. In embodiments, the APs 102 may use time-reversal techniques to focus at least some of the signal power at intended TDs, e.g., 104a, 104b, while creating little interference to other TDs, e.g., 104c, 104d. In embodiments, at least in some cases all the APs 102 and TDs 104 can work in the same signal band and that signal band may be the entire available spectrum without any partitioning. If the density of users is so high that TR focusing effects alone are not sufficient to support the required number of users, then a TR system 100 may adopt the use of cells and the available spectrum may be shared among the cells. In embodiments, a TR system may be able to switch between operating in a cell-based architecture with restricted bandwidth, and operating in a cell-free architecture where the entire available spectrum is available for use in communication with TDs.

In embodiments, a TRDMA system may operate in an indoor environment such as a room, an office, a hall way, a classroom, a house, a hotel, a building, a barn, a museum, a warehouse, a vehicle, a convention center, an amusement park, a stadium, a subway station, a train station, an airport, a shopping mall, an underground structure, a cruise ship, a tunnel, and the like. TRDMA systems may also operate in outdoor environments that have several structures or other reflecting/refracting objects in the vicinity. TRDMA systems may operate in outdoor environments referred to as "urban canyons". Multi-path Rayleigh fading channels can be used to model environments suitable for TRDMA wireless networks. The channel impulse response (CIR) of the communication link between the i-th AP 102$i$ and the corresponding j-th TD 102$j$ is modeled as $$h_{i,j}[k] = \sum_{l=0}^{L-1} h_{i,j}^{(l)} \cdot \delta[k-l] \quad (1)$$

where $h_{i,j}[k]$ is the k-th tap of the CIR with length L. For each link, we model $h_{i,j}[k]$'s as independent circular symmetric complex Gaussian random variables with zero mean and variance $$E[|h_{i,j}[k]|^2] = e^{-\frac{kT_S}{\delta_T}}, 0 \leq k \leq L-1 \quad (2)$$

where $T_S$ is the sampling period of the TD such that $$\frac{1}{T_S}$$

equals the bandwidth, B, that the TD was using and $\delta_T$ is the delay spread of the channel.

Since the APs and TDs may be deployed over a relatively large area, the path loss model is used to characterize loss of the energy due to the distance. Moreover, the signal may also suffer from the penetration loss related to wireless signals traveling through walls, doors, windows, and other types of objects and structures. That is, the inventive systems described herein may operate in line-of-sight (LOS) environments and in non-line-of-sight (NLOS) environments. The energy received by the receiver can be modeled as $$P_r = \gamma \cdot \min(1, d^{-\alpha}) \cdot P_s \quad (3)$$

where $P_r$ is the received signal power, $P_s$ is the transmitted signal power, d is the distance between the transmitter and the receiver, a is the path loss exponent, and $\gamma \leq 1$ is the penetration loss factor representing the penetration loss of the signal through some obstructions such as the wall.

Figure 2:
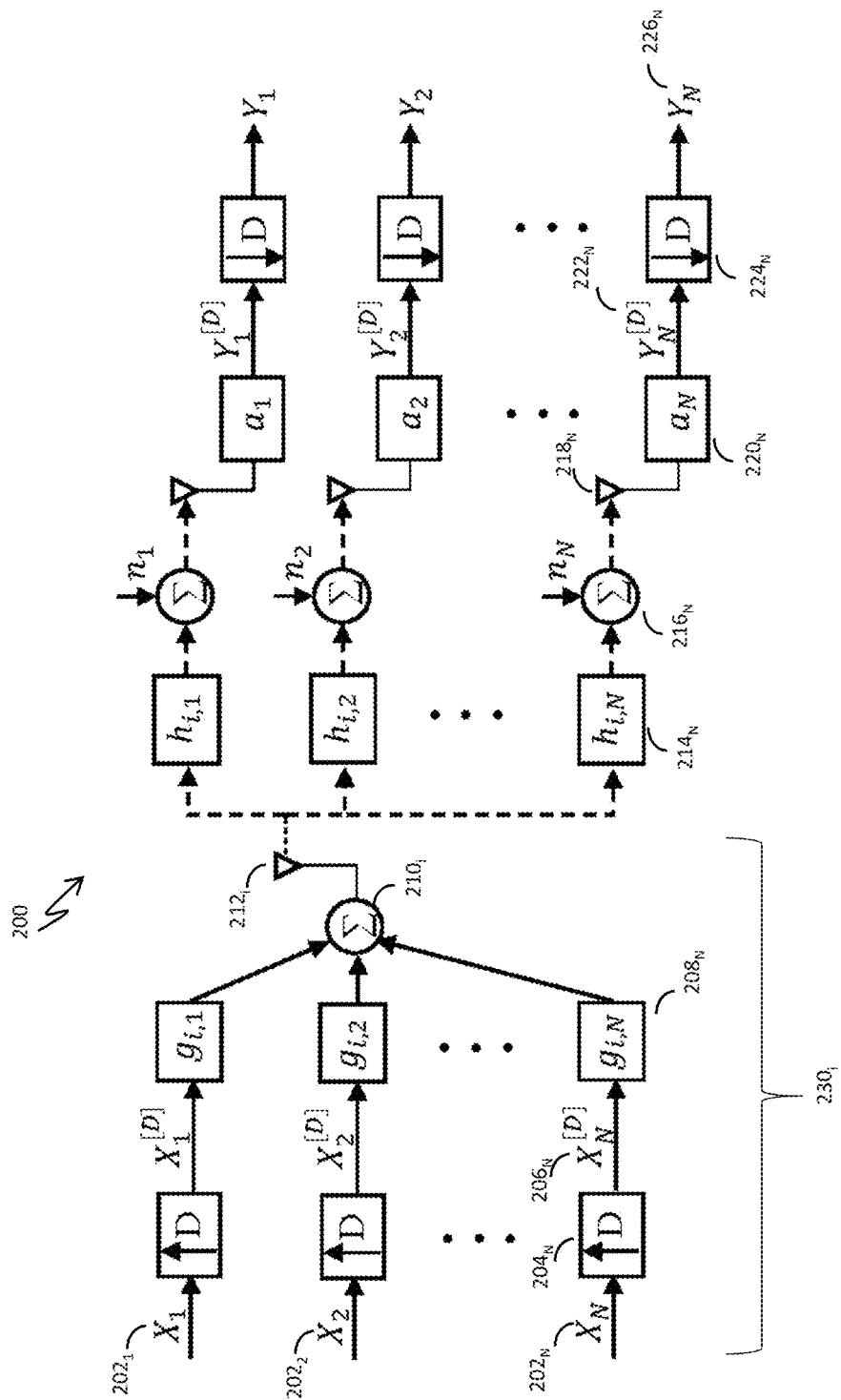
FIG. 2 shows an exemplary embodiment of a TRDMA downlink system.

In exemplary embodiments, each AP may deliver data to subscribed TDs using a TRDMA scheme. Such schemes have been described previously by the inventors, including U.S. patent application Ser. Nos. 13/706,342, 13/969,271, 13/969,320, 14/183,648, 14/202,651, 14/262,153, and 14/605,611, all of which are incorporated by reference herein in their entirety. TRDMA schemes may be described as having two phases: a channel probing phase where an AP gets channel information $h_{i,j}$, for the TD or TDs of interest (sometimes referred to as subscribed users), and a transmission phase where an AP may transmit data to any and all of the subscribed users individually or simultaneously. In an exemplary TRDMA downlink 200, as depicted in FIG. 2, an intended symbol or data sequence $X_j[k]$ 202$_j$ for the j-th TD transmitted from the i-th AP 230$_i$ may be first up-sampled 204$_j$ by a back-off factor D in order to reduce inter-symbol interference. This up-sampled symbol sequence $X_j^{[D]}$ 206$j$ can then be convolved with a time-reversed version of the signature of the channel $g_{i,j}$ 208$_j$, where $$g_{i,j}[k] = h_{i,j}^*[L-1-k] \Big/ \sqrt{\sum_{l=0}^{L-1} |h_{i,j}[l]|^2}, k = 0, 1, \ldots, L-1. \quad (4)$$

The multiple intended up-sampled symbol sequences $X_j^{[D]}$ 206 $j$ may be combined 210$_i$ in a combining unit and may be transmitted by an antenna 212$_i$. The wirelessly transmitted signals may propagate through the channels characterized by the channel information $h_{i,j}$ 214$_N$.

Note that the time-reversed version of the signature of the channel is just an example waveform that may be used in a TRDMA system. Other waveforms may be designed and utilized that also give spatial and temporal focussing of the signals at intended receivers. For example, U.S. patent application Ser. No. 13/706,342 (the '342 application), which discloses methods for designing such TRDMA waveforms, is incorporated in its entirety, herein. For example, a "designed waveform" can be a near-optimal waveform that is designed for sum rate optimization in time-reversal multiuser downlink systems as described in the '342 application. For example, the designed waveform can be determined using an iterative algorithm that solves the waveform design and power allocation in a virtual uplink system, and then uses the solution to determine downlink waveforms and power allocation, as described in the '342 application. For example, the designed waveforms can be determined for sum rate optimization in time-reversal multiuser MIMO downlink with multiple data streams as described in the '342 application. While this disclosure may present results for transmission waveforms that are based on time-reversed versions of the signature of the channel, it should be understood that designed waveforms that yield some level of spatial and temporal focusing are understood to be disclosed herein as well.

After propagating through the channel, a signal is received at a receiver antenna 218$_N$ in a TD. This received signal may be a combination of the intended signal and the interference from other users contaminated by noise 216$_N$. In exemplary embodiments a TD may first amplify the received signal with a$_j$ 220$_j$ and then down-sample it with the factor D 224$_j$, obtaining the received sequence Y$_j$ 226$_j$. In exemplary models of the system, the noise is assumed to be zero-mean additive white gaussian noise with variance $E[|n_j[k]|^2]=\sigma^2$, $\forall_j$, k.

Note that in TRDMA systems, the available bandwidth resource may be fully or almost fully reused by the APs. That is, all of the APs may work in the same band or a very similar band, which is the entire available spectrum or nearly the entire available spectrum, regardless of how close together they are spaced. Also, each AP may access the entire available spectrum or nearly the entire spectrum at any time instant. For example, the entire available spectrum may be from 2.4 GHz to 2.5 GHz. In some examples, each of the access points may use the entire spectrum from 2.4 GHz to 2.5 GHz. In some examples, a first access point may use a first frequency band from 2.40 GHz to 2.42 GHz, a second AP may use a frequency band from 2.42 GHz to 2.44 GHz, and a third AP may use a frequency band from 2.46 GHz to 2.48 GHz, and so forth. For an access point to use a particular frequency band means that the access point has, e.g., a bandpass filter that filters output signals to have a frequency spectrum that spans the particular frequency band before the output signals are transmitted from the access point to terminal devices.

Note that there are other frequency bands, channel spacings and channel bandwidths that may be used in TRDMA systems. For example, a wireless signal may be a 10 MHz wide 802.11 WiFi signal. In embodiments, a wireless signal may be in the 5.8 GHz region of the spectrum, and may have a center frequency between 5.725 GHz and 5.875 GHz. In embodiments, a wireless signal may have a bandwidth of approximately 10 MHz, 20 MHz, 40 MHz, 60 MHz, 120 MHz and 240 MHz. In embodiments, a wireless signal may have a bandwidth between 10 MHz and 1 GHz or between 500 MHz and 10 GHz.

In TRDMA systems, little or no coordination may be needed among APs since the interference among them is better alleviated compared to the traditional systems by the inherent spatial focusing of the wireless signal energy at the intended receivers and/or TDs. In exemplary embodiments, TRDMA APs may be easy to deploy and additional APs may be added to a network without disruption to the operation of the APs already operating in the network. This performance capability may not be supported by known APs that use OFDM and other non-TRDMA wireless access protocols.

Generally, in embodiments of multiple-AP systems, there can be various access control models. In an open access model, each AP may allow an arbitrary TD to subscribe to it. In embodiments, more and more APs may be added to a coverage area in an attempt to improve system capacity and support more users. The deployment of the APs may be somewhat random, as opposed to planned or placed at regular spacings such as on a grid, either due to the physical constraints of the infrastructure or unanticipated traffic demands. To model system performance, it is assumed that the distribution of the APs is subject to Poisson Point Processes (PPP) with density $\mu$. Formally, the locations of the APs are given by points of a homogeneous Poisson Point Process $\Phi$ on the plane with intensity $\mu$ in that 1) the number of APs $N(\beta)$ in any finite region $\beta$ is a Poisson random variable with mean $\mu \times \text{area}(\beta)$ $$Pr[N(\beta) = n] = e^{-\mu \times \text{area}(\beta)} \frac{[\mu \times \text{area}(\beta)]^n}{n!}, n \geq 0;$$

2) $\forall \beta, \beta'$: $\beta \cap \beta' = \emptyset \Rightarrow N(\beta), N(\beta')$ are independent; and
3) $\forall \beta$, given $N(\beta)=n$, these n APs are i.i.d. uniformly distributed over $\beta$.

Note that the Poisson distribution has the memoryless property such that $$Pr[N(\beta) > n] = Pr[N(\beta) > n+m \mid N(\beta) > m] = e^{-\mu \times \text{area}(\beta)} \frac{[\mu \times \text{area}(\beta)]^n}{n!}.$$

In exemplary embodiments, APs may not be deployed in this random manner, but this model should predict the lower bound of the performance of multiple APs deployed in real world environments and applications. In the open access model, the locations of the TDs are also assumed to be subject to a Poisson Point Process with density $\lambda$. Without loss of generality, in the exemplary embodiments considered here, the density of the TDs is assumed to be much higher than the density of the APs such that each AP has at least one subscribed user, i.e., there is no idle AP.

In a closed access subscription model, exemplary APs may only allow certain TDs to subscribe to them. Since the APs may be deployed in a fully distributed manner, we assume that the distribution of APs in the closed access model also follow the Poisson Point Process defined above but with density $\upsilon$. In embodiments where certain APs are only open to communicating with specific TDs, the distribution of the APs and TDs may be correlated with each other. In results presented below we assume the number of TDs that may be served by one single AP is a Poisson random variable $M \geq 1$, i.e., each AP has at least one subscribed TD. More specifically, $$Pr(M = k) = \begin{cases} 0 & \text{if } k = 0 \\ \frac{\tau^{(k-1)}e^{-\tau}}{(k-1)!} & \text{if } k \geq 1 \end{cases} \quad (5)$$

In exemplary embodiments of a multi-AP downlink system, each AP may serve its subscribed users using a TRDMA scheme. Let A denote the set of indices of all the APs, T the set of indexes of all the TDs, $T_i$ the set of indexes of all the TDs subscribed to the AP indexed i, and $R_j$ the set of the indices of all the interfering APs that could reach the j-th TD except the serving one, i.e., all the interfering APs. Note that we have $T_i \subseteq T$, $R_j \subseteq A$. The signal received by TD j subscribed to the AP i that is equipped with $Q_T$ transmitting antennas can be represented as $$Y_j[k] = a_j \sum_{m \in T_i} \sum_{q=1}^{Q_T} \sum_{l=0}^{(2L-2)/D} \left(h_{i,j}^{(q)} * g_{i,m}^{(q)}\right)[Dl] X_m[k-l] + \quad (6)$$

$$a_j \sum_{n \in R_j} \sum_{m \in T_n} \sum_{q=1}^{Q_T} \sum_{l=0}^{(2L-2)/D} \left(h_{n,j}^{(q)} * g_{n,m}^{(q)}\right)[Dl] X_m[k-l] + a_j n_j[k]$$

where the first term on the right hand side of the equation is the signal received from the subscribed AP, the second term is the signal received from all the interfering APs and the third term denotes the noise. In the rest of these examples, without loss of generality, we assume that all the APs have the same number of antennas $Q_T$. In embodiments, each of the APs and TDs may have one or more antennas. In embodiments, APs may have different numbers of antennas, TDs may have different numbers of antennas, and the number of antennas in an AP and a TD may be different or may be the same. The assumption of the same number of antennas here is made to clarify the mathematical description.

Eqn. (6) could be further written as $$Y_j[k] = a_j \sum_{q=1}^{Q_T} X_j[k] \cdot h_{i,j}^{(q)} * g_{i,j}^{(q)}[L-1] + \quad (7)$$

$$a_j \sum_{q=1}^{Q_T} \sum_{\substack{l=0 \\ l(L-1)/D}}^{(2L-2)/D} \left(h_{i,j}^{(q)} * g_{i,j}^{(q)}\right)[Dl] X_m[k-l] +$$

-continued $$a_j \sum_{\substack{m \in T_j \\ m \neq j}} \sum_{q=1}^{Q_T} \sum_{l=0}^{(2L-2)/D} (h_{i,j}^{(q)} * g_{i,m}^{(q)})[Dl]X_m[k-l] +$$

$$a_j \sum_{n \in R_j} \sum_{m \in T_n} \sum_{q=1}^{Q_T} \sum_{l=0}^{(2L-2)/D} (h_{n,j}^{(q)} * g_{n,m}^{(q)})[Dl]X_m[k-l] + a_j n_j[k]$$

where the first term stands for the intended signal received by the TD, the second term the inter-symbol interference (ISI), the third term the inter-user interference (IUI) and the fourth term the inter-cell interference (ICI). In the following, we will analyze the signal power and the interference power to obtain the effective signal-to-interference plus noise (SINR).

We evaluate the effective SINR which is defined as $$SINR_{eff} = \frac{E[P_{SIG}]}{E[P_{ISI}] + E[P_{IUI}] + E[P_{ICI}] + \sigma^2} \quad (8)$$

where $\sigma^2$ is the power of noise. By assuming equal power allocation in each AP among all subscribed users, the expected received signal power depending on the number of subscribed users N can be represented as $$E[P_{SIG} | N] =$$

$$\theta \frac{1+e^{-\frac{LT_S}{\delta_T}}}{1+e^{-\frac{T_S}{\delta_T}}} + \theta Q_T \frac{1-e^{-\frac{LT_S}{\delta_T}}}{1-e^{-\frac{T_S}{\delta_T}}} = \frac{1}{N} \cdot \frac{1+e^{-\frac{LT_S}{\delta_T}}}{1+e^{-\frac{T_S}{\delta_T}}} + \frac{Q_T}{N} \cdot \frac{1-e^{-\frac{LT_S}{\delta_T}}}{1-e^{-\frac{T_S}{\delta_T}}}$$

where $\theta$ is the expected power used for transmitting a symbol and the second equality comes from the assumption of equal power allocation among all the subscribed users. In further examples, without loss of generality, equal power allocation will be assumed. In embodiments, different power levels may be allocated to different users. The conditional expected interference power can be represented by $$E[P_{ISI} | N] = \frac{e^{-\frac{DT_S}{\delta_T}} - e^{-\frac{(L+D-1)T_S}{\delta_T}} - e^{-\frac{(L+1)T_S}{\delta_T}} + e^{-\frac{2LT_S}{\delta_T}}}{N(1+e^{-\frac{T_S}{\delta_T}})(1-e^{-\frac{DT_S}{\delta_T}})(1-e^{-\frac{LT_S}{\delta_T}})}$$

$$E[P_{IUI} | N] = \frac{N-1}{N} \cdot \frac{(1+e^{-\frac{DT_S}{\delta_T}})(1+e^{-\frac{2LT_S}{\delta_T}}) - 2e^{-\frac{(L+1)T_S}{\delta_T}}(1+e^{-\frac{(D-2)T_S}{\delta_T}})}{(1-e^{-\frac{DT_S}{\delta_T}})(1+e^{-\frac{DT_S}{\delta_T}})(1-e^{-\frac{LT_S}{\delta_T}})}$$

Note that the distribution of N users is different for open and closed access models, which leads to different interference analyses as shown below.

In an exemplary open access subscription model, we assume that each TD is subscribed to the nearest AP. Then, the coverage area A of a single AP can be predicted by the gamma distribution $$f(A) = \mu^K \frac{K^K}{\Gamma(K)} A^{(K-1)} e^{(-K\mu A)} \quad (9)$$

where $\mu$ is the density of the APs, K=3.575.

Since it is assumed that each AP has at least one subscribed TD, by the memoryless property of the Poisson distribution, the distribution of the number of subscribed users can be represented as $$Pr(N = k | A) = \begin{cases} 0 & \text{if } k = 0 \\ \frac{(\lambda A^{(k-1)}) e^{-\lambda A}}{(k-1)!} & \text{if } k \geq 1 \end{cases} \quad (10)$$

where we can obtain $$E\left[\frac{1}{N} \Big| A\right] = \frac{1 - e^{-\lambda A}}{\lambda A} \quad (11)$$

and $$E\left[\frac{1}{N}\right] = \frac{(\mu K)^K}{\lambda(K-1)}[(\mu K)^{(1-K)} - (\mu K + \lambda)^{(1-K)}] \quad (12)$$

The expected signal power can be expressed as follows:

$$E[P_{SIG}] = E[E[P_{SIG} | N]] = \frac{(\mu K)^K}{\lambda(K-1)}[(\mu K)^{(1-K)} - (\mu K + \lambda)^{(1-K)}] \cdot \quad (13)$$

$$\left(\frac{1+e^{-\frac{LT_S}{\delta_T}}}{1+e^{-\frac{T_S}{\delta_T}}} + Q_T \cdot \frac{1-e^{-\frac{LT_S}{\delta_T}}}{1-e^{-\frac{T_S}{\delta_T}}}\right)$$

where the last equality comes from using (12). Similarly, the expected power of ISI and IUI can be obtained by:

$$E[P_{ISI}] = E[E[P_{ISI} | N]] = \frac{(\mu K)^K}{\lambda(K-1)}[(\mu K)^{(1-K)} - (\mu K + \lambda)^{(1-K)}] \cdot \quad (14)$$

$$\frac{e^{-\frac{DT_S}{\delta_T}} - e^{-\frac{(L+D-1)T_S}{\delta_T}} - e^{-\frac{(L+1)T_S}{\delta_T}} + e^{-\frac{2LT_S}{\delta_T}}}{(1+e^{-\frac{T_S}{\delta_T}})(1-e^{-\frac{DT_S}{\delta_T}})(1-e^{-\frac{LT_S}{\delta_T}})}$$

and $$E[P_{IUI}] = \quad (15)$$

$$E[E[P_{IUI} | N]] = \left(1 - \frac{(\mu K)^K}{\lambda(K-1)}[(\mu K)^{(1-K)} - (\mu K + \lambda)^{(1-K)}]\right) \cdot$$

$$\frac{(1+e^{-\frac{DT_S}{\delta_T}})(1+e^{-\frac{2LT_S}{\delta_T}}) - 2e^{-\frac{(L+1)T_S}{\delta_T}}(1+e^{-\frac{(D-2)T_S}{\delta_T}})}{(1-e^{-\frac{DT_S}{\delta_T}})(1+e^{-\frac{DT_S}{\delta_T}})(1-e^{-\frac{LT_S}{\delta_T}})}$$

Next, we analyze the intercell interference or ICI. Since it is assumed that each AP has at least one subscribed TD, each AP is modeled as always transmitting with full power independent of the number of subscribed TDs. We first consider the ICI power from one single interfering AP close enough that the path loss can be omitted. In that case, the ICI power can be written as $$E\left[P_{ICI}^{(single)}\right] = E\left[E_X\left[\left|\sum_{m \in T_n} \sum_{q=1}^{Q_T} \sum_{l=0}^{(2L-2)/D} (h_{n,j}^{(q)} * g_{n,m}^{(q)})[Dl]X_m[k-l]\right|^2\right]\right] = \quad (16)$$

$$\frac{\left(1+e^{-\frac{DT_S}{\delta_T}}\right)\left(1+e^{-\frac{2LT_S}{\delta_T}}\right)-2e^{-\frac{(L+1)T_S}{\delta_T}}\left(1+e^{-\frac{(D-2)T_S}{\delta_T}}\right)}{\left(1-e^{-\frac{DT_S}{\delta_T}}\right)\left(1+e^{-\frac{DT_S}{\delta_T}}\right)\left(1-e^{-\frac{LT_S}{\delta_T}}\right)}.$$

where D is the back-off factor used by the AP.

Since the signal from the interfering AP may be reduced by path loss, interfering APs far away from a TD have less influence on the received signals. If it is assumed that only the interfering APs within distance R of the TD contribute to the ICI, then the expected ICI power can be represented by $$E[P_{ICI}^{(R)}] = E\left[\sum_{i=1}^{N_2} \min(1, d_i^{-\alpha})\right] \cdot E[P_{ICI}^{single}] \quad (17)$$

$$= E[N_2] \cdot E[\min(1, d_i^{-\alpha})] \cdot E[P_{ICI}^{single}]$$

$$= \mu\left(\pi + \frac{2\pi(1-R^{2-\alpha})}{\alpha-2}\right) \cdot E[P_{ICI}^{single}]$$

where the second equality comes from the Wald's Equation and the third equality uses $$E[\min(1, d_i^{-\alpha})] = \quad (18)$$

$$\int_0^{2\pi}\int_0^1 \frac{1}{\pi R^2} \cdot r\,dr\,d\theta + \int_0^{2\pi}\int_1^R \frac{r^{-\alpha}}{\pi R^2} \cdot r\,dr\,d\theta = \frac{1}{R^2}\left(1 + \frac{2-2R^{2-\alpha}}{\alpha-2}\right).$$

By taking the limit $R \to \infty$ to consider the ICI from all the interfering APs, Equation 17 becomes $$E[P_{ICI}] = \lim_{R \to \infty} E[P_{ICI}^{(r)}] = \mu\left(\pi + \frac{2\pi}{\alpha-2}\right) \cdot \quad (19)$$

$$\frac{\left(1+e^{-\frac{DT_S}{\delta_T}}\right)\left(1+e^{-\frac{2LT_S}{\delta_T}}\right)-2e^{-\frac{(L+1)T_S}{\delta_T}}\left(1+e^{-\frac{(D-2)T_S}{\delta_T}}\right)}{\left(1-e^{-\frac{DT_S}{\delta_T}}\right)\left(1+e^{-\frac{DT_S}{\delta_T}}\right)\left(1-e^{-\frac{LT_S}{\delta_T}}\right)}.$$

Substituting (13), (14), (15) and (19) into (8), the effective SINR of an individual user can be obtained as a function of $\lambda$ and $\mu$.

Accordingly, the achievable data rate of each individual user can be expressed as $$C(\lambda, \mu) = \frac{1}{D}\log_2(1 + SINR_{eff}(\lambda, \mu)). \quad (20)$$

In addition to the individual data rate, the achievable sum data rate of the system can be expressed as $$C_{sum}(\lambda, \mu) = \frac{\lambda}{D}\log_2(1 + SINR_{eff}(\lambda, \mu)) \quad (21)$$

which is the sum of the achievable data rates of the TDs per unit area. More specifically, for any fixed $\mu$, there is a limit of $C_{sum}(\lambda, \mu)$ if $\lambda \to \infty$, which can be expressed as $$\tilde{C} = \lim_{\lambda \to \infty} C_{sum} \quad (22)$$

$$= \lim_{\lambda \to \infty} \frac{\lambda}{D} \cdot \frac{\ln(1 + SINR_{eff})}{\ln(2)}$$

$$\approx \lim_{\lambda \to \infty} \frac{\lambda \cdot SINR_{eff}}{D \cdot \ln(2)}$$

$$= \frac{\frac{(\mu K)^K}{(K-1)}[(\mu K)^{(1-K)}] \cdot \left(\frac{1+e^{-\frac{LT_S}{\delta_T}}}{1+e^{-\frac{T_S}{\delta_T}}} + Q_T \cdot \frac{1-e^{-\frac{LT_S}{\delta_T}}}{1-e^{-\frac{T_S}{\delta_T}}}\right)}{D \cdot \ln(2) \cdot \Theta}$$

where $$\Theta = \frac{\left(1+e^{-\frac{DT_S}{\delta_T}}\right)\left(1+e^{-\frac{2LT_S}{\delta_T}}\right)-2e^{-\frac{(L+1)T_S}{\delta_T}}\left(1+e^{-\frac{(D-2)T_S}{\delta_T}}\right)}{\left(1-e^{-\frac{DT_S}{\delta_T}}\right)\left(1+e^{-\frac{DT_S}{\delta_T}}\right)\left(1-e^{-\frac{LT_S}{\delta_T}}\right)} + \quad (23)$$

$$\mu\left(\pi + \frac{2\pi}{\alpha-2}\right) \cdot$$

$$\frac{\left(1+e^{-\frac{DT_S}{\delta_T}}\right)\left(1+e^{-\frac{2LT_S}{\delta_T}}\right)-2e^{-\frac{(L+1)T_S}{\delta_T}}\left(1+e^{-\frac{(D-2)T_S}{\delta_T}}\right)}{\left(1-e^{-\frac{DT_S}{\delta_T}}\right)\left(1+e^{-\frac{DT_S}{\delta_T}}\right)\left(1-e^{-\frac{LT_S}{\delta_T}}\right)} + \sigma^2.$$

The approximation $\ln(1+SINR_{eff}) \approx SINR_{eff}$ is used when $\lambda$ is large and $SINR_{eff}$ is low.

In an exemplary closed access model, each AP only allows specific TDs to subscribe to it. In this scenario, the AP and the designated TDs are usually close to each other. Therefore, in the closed access model, the signal path loss from the AP to the designated TDs can be neglected and the signal received by the TD may be only dependent on M which is the number of TDs subscribed to the AP. By (5), the expected value of $$\frac{1}{M}$$

can be calculated as $$E\left[\frac{1}{M}\right] = \frac{1-e^{-\tau}}{\tau}. \quad (24)$$

Similar to the approach in the open access model, the expected signal and interference power in the closed access model can be represented as $$E[P_{SIG}] = E[E[P_{SIG}|M]] = \frac{1-e^{-\tau}}{\tau} \cdot \left(\frac{1+e^{-\frac{LT_S}{\delta_T}}}{1+e^{-\frac{T_S}{\delta_T}}} + Q_T \cdot \frac{1-e^{-\frac{LT_S}{\delta_T}}}{1-e^{-\frac{T_S}{\delta_T}}}\right) \quad (25)$$

$$E[P_{ISI}] = E[E[P_{ISI}|M]] = \quad (26)$$

$$\frac{1-e^{-\tau}}{\tau} \cdot \frac{e^{-\frac{DT_S}{\delta_T}} - e^{-\frac{(L+D-1)T_S}{\delta_T}} - e^{-\frac{(L+1)T_S}{\delta_T}} + e^{-\frac{2LT_S}{\delta_T}}}{\left(1+e^{-\frac{T_S}{\delta_T}}\right)\left(1-e^{-\frac{DT_S}{\delta_T}}\right)\left(1-e^{-\frac{LT_S}{\delta_T}}\right)}$$

$$E[P_{IUI}] = E[E[P_{IUI} \mid M]] = \quad (27)$$

$$E\left[\frac{M-1}{M} \cdot \frac{\left(1+e^{-\frac{DT_S}{\delta T}}\right)\left(1+e^{-\frac{2LT_S}{\delta T}}\right)-2e^{-\frac{(L+1)T_S}{\delta T}}\left(1+e^{-\frac{(D-2)T_S}{\delta T}}\right)}{\left(1-e^{-\frac{DT_S}{\delta T}}\right)\left(1+e^{-\frac{DT_S}{\delta T}}\right)\left(1-e^{-\frac{LT_S}{\delta T}}\right)}\right] =$$

$$\left(1 - \frac{1-e^{-\tau}}{\tau}\right) \cdot$$

$$\frac{\left(1+e^{-\frac{DT_S}{\delta T}}\right)\left(1+e^{-\frac{2LT_S}{\delta T}}\right)-2e^{-\frac{(L+1)T_S}{\delta T}}\left(1+e^{-\frac{(D-2)T_S}{\delta T}}\right)}{\left(1-e^{-\frac{DT_S}{\delta T}}\right)\left(1+e^{-\frac{DT_S}{\delta T}}\right)\left(1-e^{-\frac{LT_S}{\delta T}}\right)}$$

Since each AP is modeled to have at least one subscribed user, the model assumes the APs are transmitting with the full power independent of the number of subscribed users.

Therefore, the power of ICI is only dependent on the density of the APs and it can be obtained by replacing λ and μ in (19) by τ and υ, respectively.

Substituting (25), (26), (27), and (19) into (8), the effective SINR of individual users can be represented as $$SINR(\tau, \upsilon) = \frac{P_{SIG}(\tau, \upsilon)}{P_{ISI}(\tau, \upsilon) + P_{IUI}(\tau, \upsilon) + P_{ICI}(\upsilon) + \sigma^2} \quad (28)$$

Accordingly, the achievable spectrum efficiency of each individual user could be expressed as $$R(\tau, \upsilon) = \frac{1}{D}\log_2(1 + SINR(\tau, \upsilon)) \quad (29)$$

Numerical simulations and measurements of exemplary embodiments of wireless networks can be used to compare the performance of different communication protocols and to show advantages of the TR system in tackling the high network densification challenge.

Figure 3:
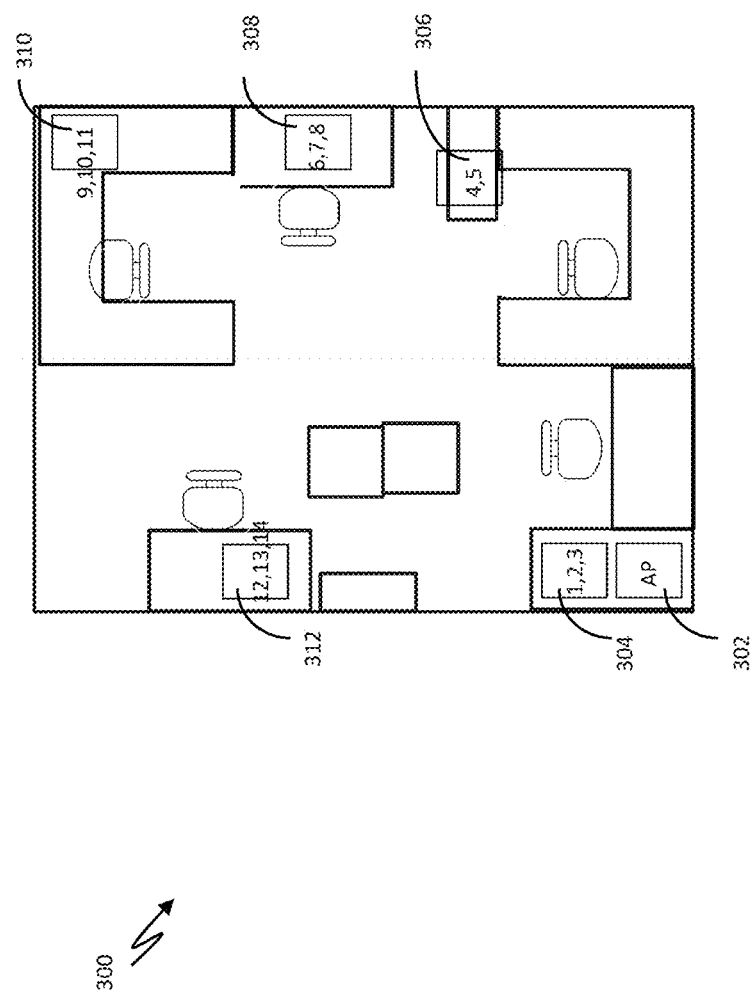
FIG. 3 shows the floorplan of an office used to characterize wireless network performance. The system used one AP to communicate with up to fourteen TDs, labeled 1 to 14 in the figure.

First, we experimentally characterized a commercially available wireless communication system using the 802.11 communication protocol. FIG. 3 shows a floor plan of the office environment 300 used in the experimental measurements, along with the position of the AP 302 and the positions of the TDs (shown grouped in areas 304, 306, 308, 310 and 312). The system included 1 AP and 14 TDs indexed from 1 to 14, all of which were equipped with IEEE 802.11n air interfaces. We utilized TCP connections between the AP and TDs enabled by Iperf (the TCP/UDP bandwidth measurement tool-available at the web link "https://iperf.fr/") and measured the data throughput of the APs and to the TDs in Mb/s.

We characterized system performance in five (5) different test scenarios, summarized in Table 1. In test case a, the AP communicated with three TDs (1, 7, 9), test case b, with six TDs (1, 2, 5, 7, 9, 10), test case c, with nine TDs (1, 2, 3, 5, 6, 7, 8, 9, 10), test case d, with eleven TDs (1, 2, 3, 4, 5, 6, 7, 8, 9, 10, 11), and in test case e, with all fourteen TDs (1, 2, 3, 4, 5, 6, 7, 8, 9, 10, 11, 12, 13, 14).

Figure 4:
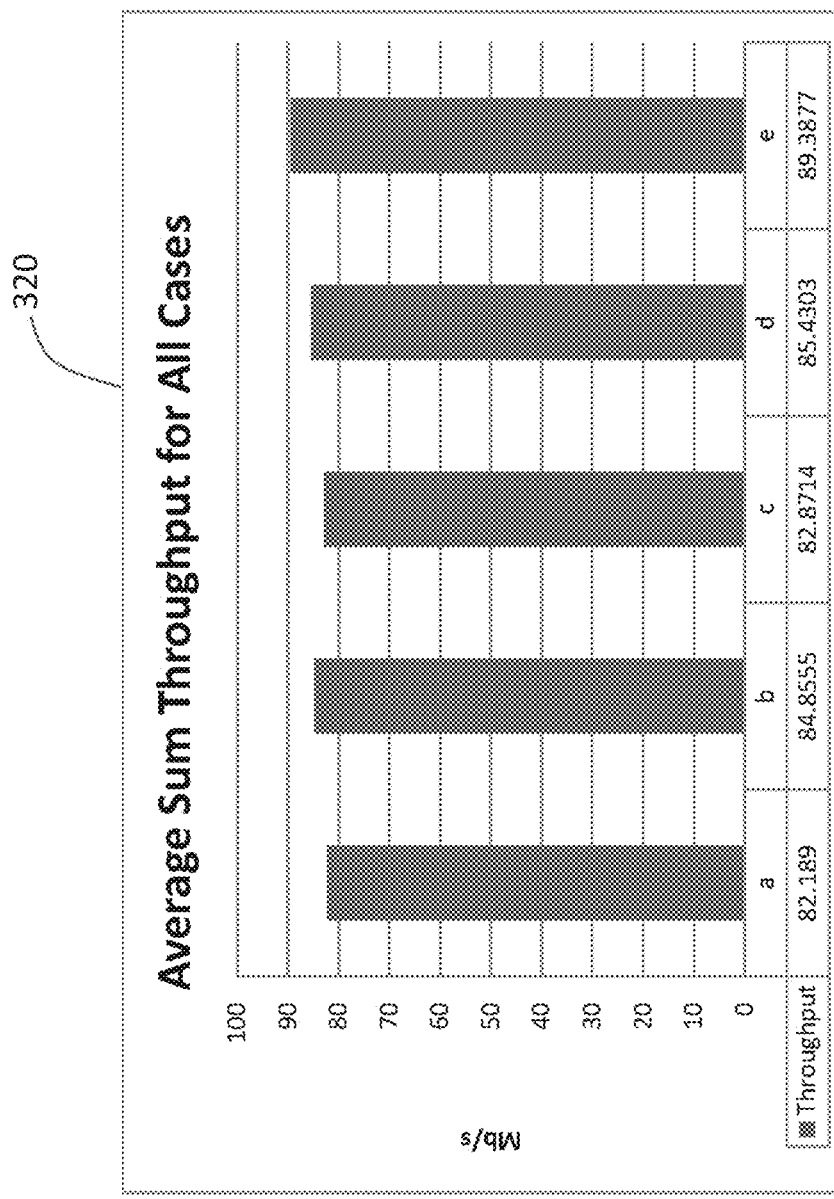
FIG. 4 shows the average sum data throughput, measured in Mb/s, for 802.11 network test cases a through e.
Figure 5:
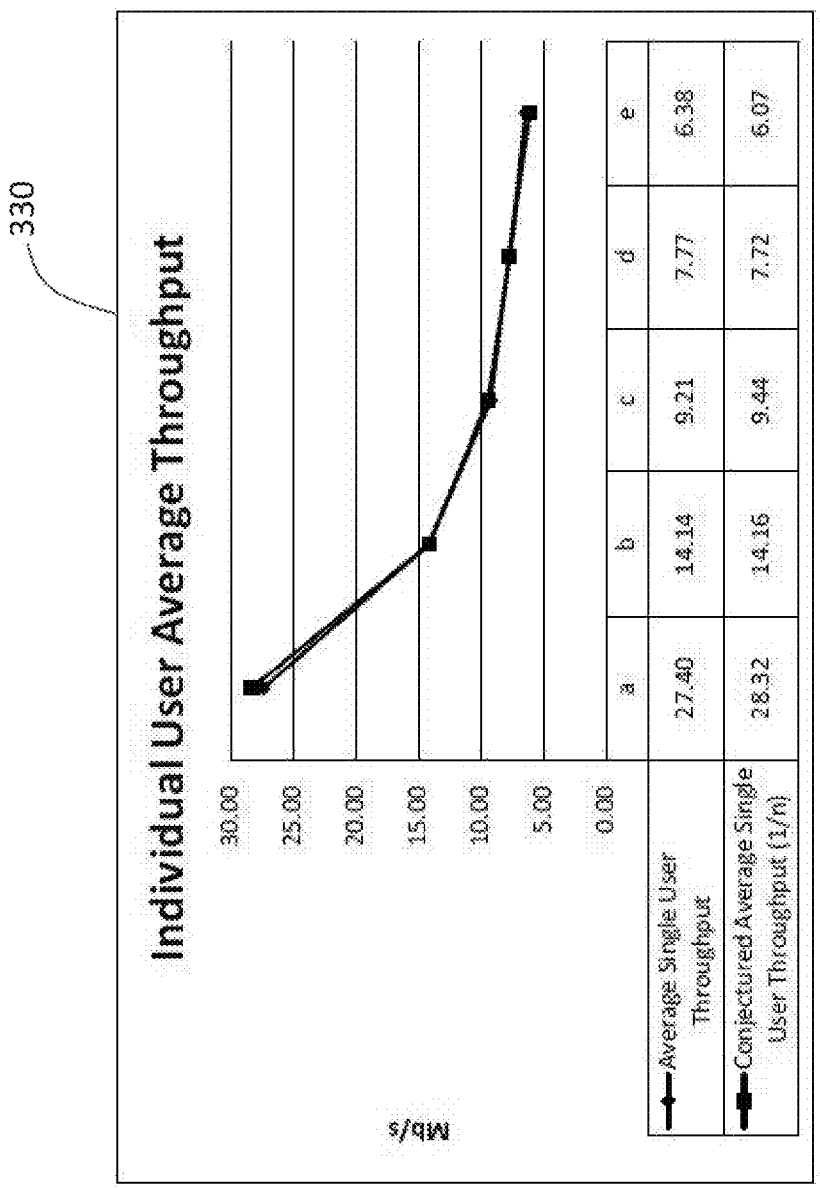
FIG. 5 shows the average individual user throughput, measured in Mb/s, for 802.11 network test cases a through e.

The results of the measurements are shown in FIGS. 4 and 5. FIG. 4 is a graph 320 that shows the sum throughput keeps almost constant regardless of the number of active devices using the network. In other words, when there are more TDs served by the AP, the TDs all share the limited throughput so that the throughput to any one TD is decreasing as more TDs join the network. This sharing of the total bandwidth supported by the AP is also shown by the results in FIG. 5. FIG. 5 is a graph 330 that shows the average throughput to each user is approximately inversely proportional to the number of users n subscribed to the AP, i.e., each user shares approximately 1/n of the total throughput. Therefore, when there are many users of an 802.11 based wireless system, the throughput for each user decreases as additional users join the network. That is, using existing networking protocols, the throughput to individual users will be extremely small, perhaps even close to zero, as network densification increases

TABLE 1

| Test Cases | |
|---|---|
| Test Case ID | ID's of the Active TDs |
| a | 1, 7, 9 |
| b | 1, 2, 5, 7, 9, 10 |
| c | 1, 2, 3, 5, 6, 7, 8, 9, 10 |
| d | 1, 2, 3, 4, 5, 6, 7, 8, 9, 10, 11 |
| e | 1, 2, 3, 4, 5, 6, 7, 8, 9, 10, 11, 12, 13, 14 |

One way to potentially overcome the reduction in throughput measured above is to add more APs to the network. However, without careful channel planning and precise positioning of the APs, the effective achievable data rate of the 802.11 based system may not increase. In some cases, the interference caused by the signals from one AP at an unintended TD may even further decrease the throughput to the individual TDs.

Figure 6:
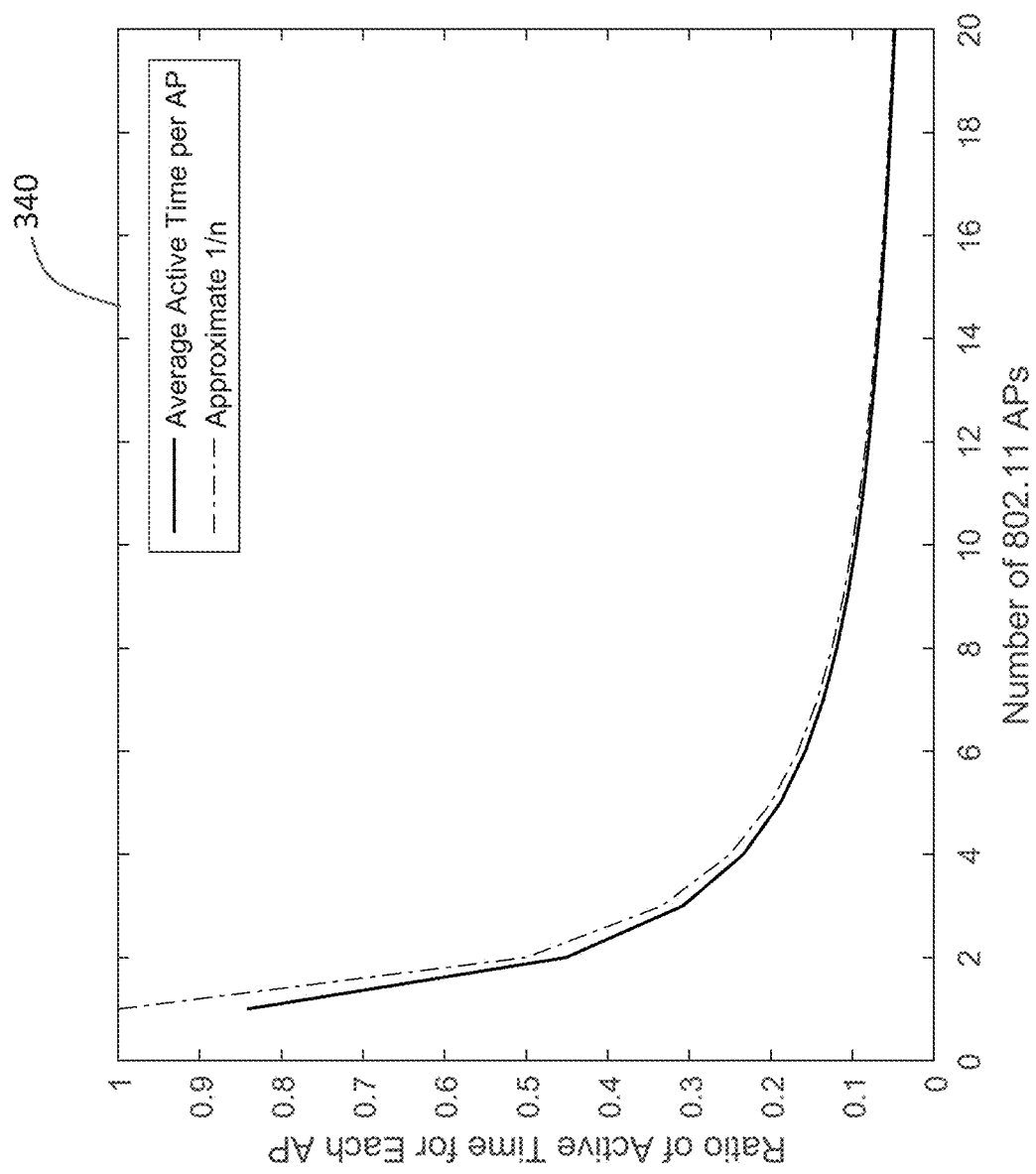
FIG. 6 shows the predicted average active time for each AP in an 802.11 network as a function of APs in the network.

Consider an exemplary network where Z APs are randomly deployed in a certain area such that all of the APs are within range of the others. In embodiments, APs are within range if the signal strength of a signal from one AP is large enough at another AP, that the two devices could exchange data signals as if they were one AP and one TD. For 802.11 based systems, within range may include AP separations between 10 meters and 250 meters, depending on the environment in which the APs are deployed. In the 802.11 based multiple AP downlink system, the APs may work with each other using the distributed coordination function (DCF). In the downlink case, the effect of the DCF can be that each AP is in one of three states: actively transmitting, backed off, or blocked by other APs. That is, each AP needs to obtain the exclusive use of the wireless channel to transmit, so only one AP is transmitting and delivering downlink data to subscribed users at a particular time. FIG. 6 is a graph 340 that shows the predicted average active time for each AP in an 802.11 network as a function of APs in the network. Note the average active time is close to 1/Z, where Z is the number of APs.

Thus, if we consider the effective achievable data rate $$U = G * T \quad (30)$$

where G is the link capacity and T is the average active time for each link in one second, we see that adding more APs to a traditional wireless network, such as an 802.11 network, does not significantly increase the effective achievable data rate.

One way to increase the effective achievable data rate is to use TR wireless protocols and signaling. In this subsection, we will show the scalability of the TR system in the open access case such that it can be easily extended to boost the achievable data rate in the massive device setting.

Figure 7:
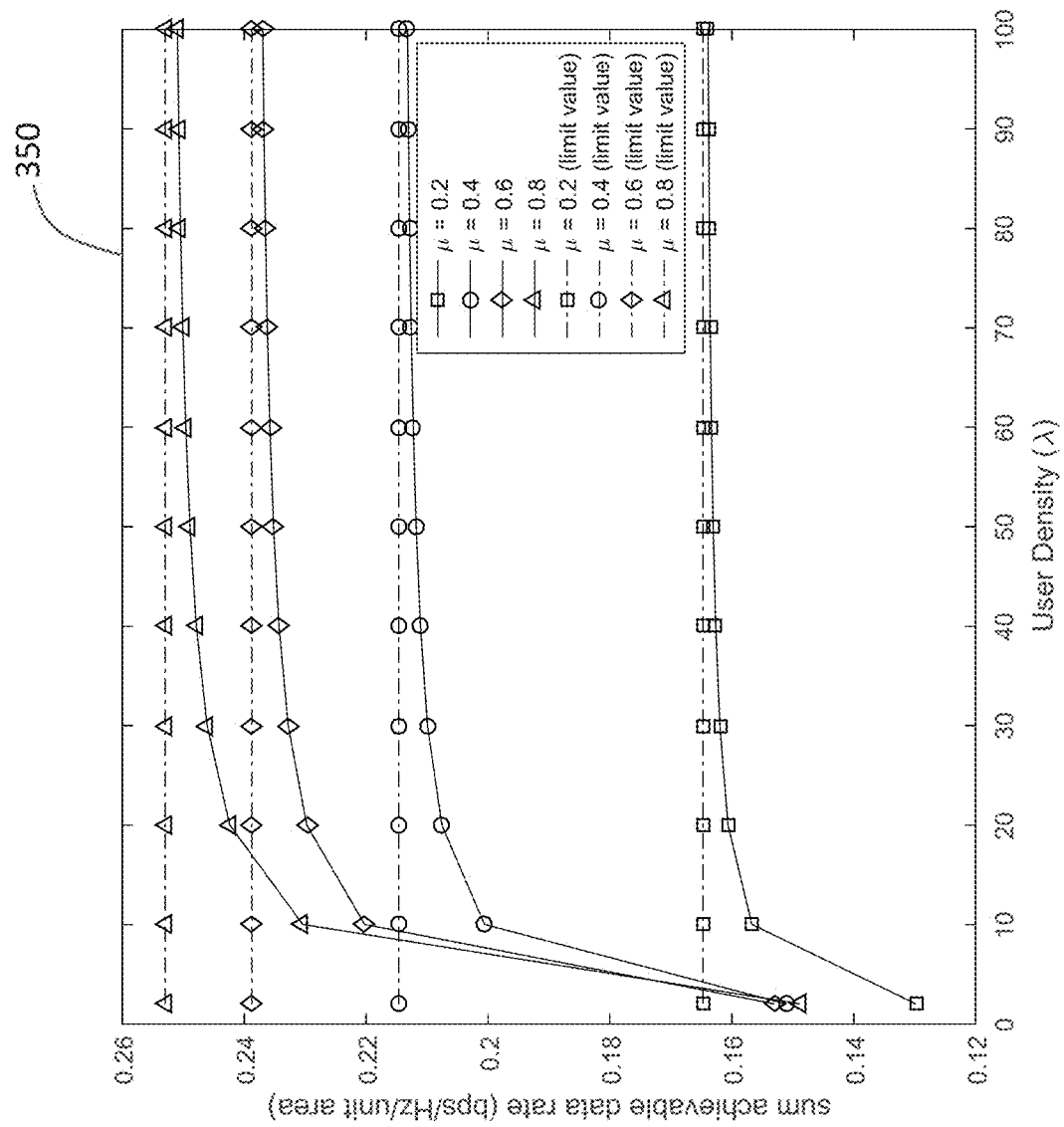
FIG. 7 shows the predicted total achievable data rate as a function of user density, $\lambda$, for various values of AP densities, $\mu$.

Recall that open access TR wireless networks can be characterized by the density of APs (μ) and TDs (λ) in the network with the distributions of APs and TDs modeled as Poisson Point Processes (PPP). FIG. 7 is a graph 350 that shows the predicted sum achievable data rate as a function of user density, λ, for various values of AP densities, μ. Note that as described in EQ. 21, $C_{sum}(\lambda, \mu)$ is an increasing function of both λ and μ. For any fixed μ, the total achievable rate increases as λ increases. This means that unlike the traditional network described above, the total achievable data rate of a TR system increases as the number of subscribed TDs increases. However, $C_{sum}(\lambda, \mu)$ approaches the limit described in EQ. 22 when λ is large (depicted as the dashed lines in FIG. 7). This limit is approached when the interference power dominates the signal power in the massive device setting and may be associated with too many TDs being served by one single AP. Fortunately, such a saturation problem can be tackled in TR systems by increasing the density of APs. As shown in a graph 360 in FIG. 8, for any fixed λ, the total achievable rate increases with the increment of μ. In other words, the achievable rate of each individual TD can be boosted when more APs are installed.

In the 802.11 technology, careful spectrum planning and coordination is needed when placing multiple APs close to each other to avoid interference. In the exemplary TR systems, the time-reversal focusing effects create natural space-time separation among users, thus reducing interference with each other (and with other APs), and no particular spectrum planning may be needed when adding new APs into the system. Moreover, since the APs work in a fully distributed manner, there may be little or no information shared or exchanged among APs. In such a case, extra APs can be added to the system to boost the performance when needed, and removed when not necessary. In such a scenario, an AP can include an activation switch that activates the AP when it is needed, and deactivates it otherwise. Deactivating unneeded APs may decrease power consumption and reduce interference in wireless networks. In embodiments, TR systems may benefit from APs that can be actively turned on or off in response to data demands, control signals, device counts, feedback signals and the like. In other words, the TR-based multi-AP downlink system is highly scalable and can accommodate different user densities.

Figure 8:
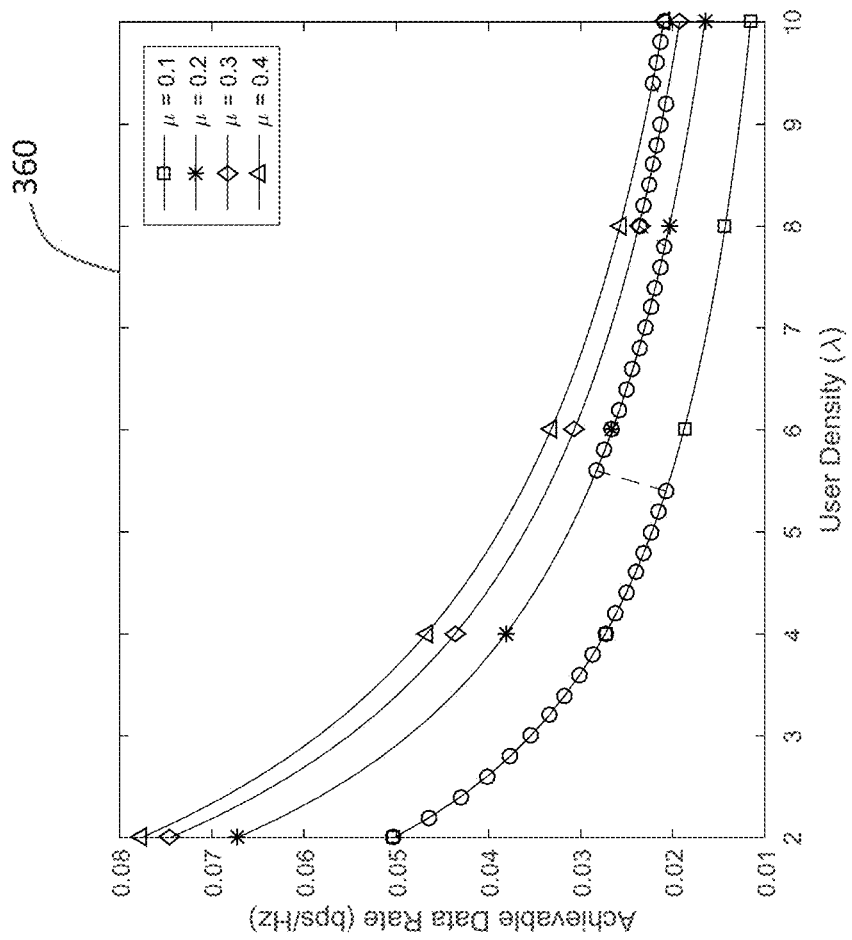
FIG. 8 shows the achievable data rate for individual users of a TR wireless networking system as a function of user density, $\lambda$, as more APs are added to the network.

To demonstrate the scalability of the TRDMA system, we show an example of how an operator can adjust the system according to the user density. The graph 360 of FIG. 8 shows the achievable data rate for individual users of a TR wireless networking system as a function of user density, λ, as more APs are added to the network. Note that generally, the achievable data rate of each individual TD may decrease as the density of TDs grows owing to less signal power delivered to each TD (because the total power delivered by the AP is limited), and stronger interference. In embodiments, a network operator may want to maintain an achievable data rate of each TD to be above a certain threshold. In embodiments, an operator can install or turn on extra APs without any pre-planning or communication amongst the APs when the achievable data rate reaches the threshold. In embodiments, the network operate may adjust, switch, turn on, turn off, and the like APs in the network manually, automatically, under computer control, using a graphical user interface, using an "app", using a network management system and the like. In embodiments, wireless access points in TR systems may include a controllable activation switch to support flexible networking embodiments. Using the TR protocol, turning on additional APs may automatically boost the achievable data rate to TDs in the network.

Note that in the data presented in the graph 360 of FIG. 8, an AP density of μ=0.1 corresponds to 1 AP in approximately every ten (10) square meters of space. Therefore, the TR system can have non-interfering APs placed relatively close to each other without having to divide up the available spectrum and/or tune their center operating frequency. The data in FIG. 8 suggests that TR APs may be spaced by approximately three (3) meters, 1.5 m, 1 m or 0.75 m and still be able to improve the achievable data rate of individual TDs using the network. As described above, these APs may be installed at any time and may be turned on or off to meet the demands of individual high data rate TDs and large numbers of TDs. Additional APs in a system may be adjusted to reduce their output power to support a fewer number of TDs than would be supported at full power. APs may have their output power turned down or turned off to save power, to reduce interference, and/or to support hierarchical networks and quality of service agreements. For example, in power constrained networks, some users may be identified as priority users or may have paid for higher quality network services. In those embodiments, certain APs may be used to support the priority users and certain other APs may be used to support other, lower-priority users. In embodiments, some APs or groups of APs may supply guaranteed bandwidth services to network users and other APs or groups of APs may be used to supply bandwidth on demand to users.

Figure 9:
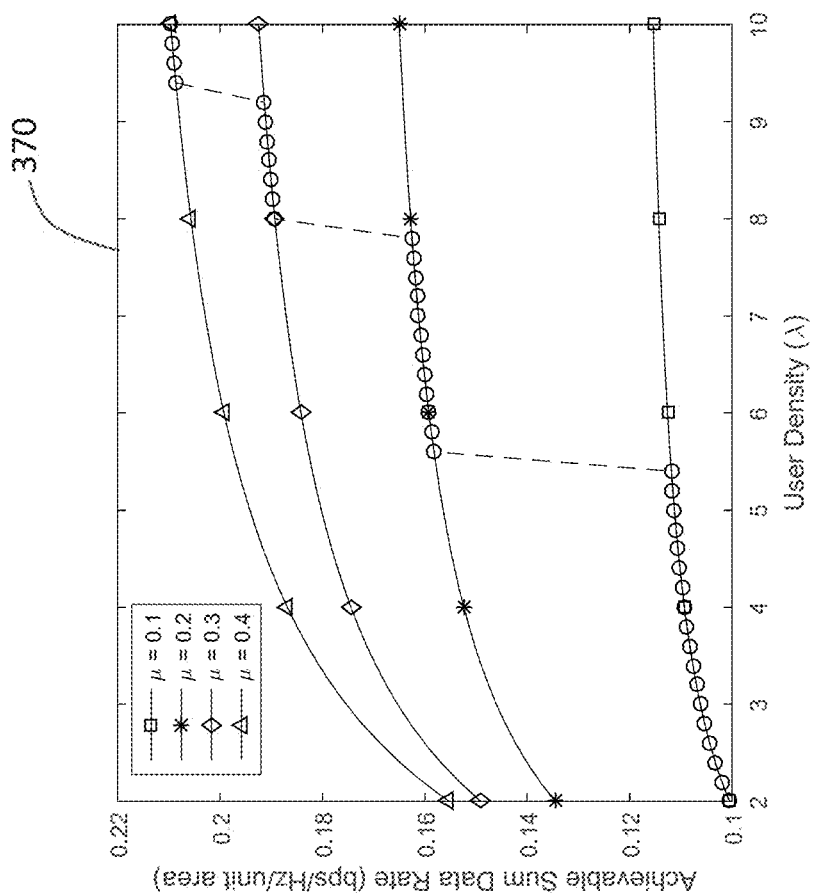
FIG. 9 shows the achievable sum data rate for a TR wireless networking system as a function of user density, $\lambda$, as more APs are added to the network.

FIG. 9 is a graph 370 that shows another example of how achievable sum data rate of a network may be significantly improved when extra TR APs are added to the network. That is, the additional APs may bring in new bandwidth resources to the system that can be shared by the TDs. Note that the scaling of the TR system performance according to the number of users (TDs) and/or APs in the network is fundamentally different than the scaling of the 802.11 system performance, that showed each user's achievable data rate decreasing as users were added to the network and no significant increase in achievable sum data rate as WiFi APs were added to a network.

Note that the results discussed above are for open access TR systems. Closed access TR systems do not scale the same way when TDs are not allowed to subscribe to multiple different APs. Therefore, adding APs in a closed access TR system does not serve to increase the data rate delivered to existing TDs in the network, but rather is an interference source for them. As a result, as more APs are installed, each TD may have a higher risk of failure because the additional APs cause interference and reduce the achievable data rate. However, we can use our TR system models to show that closed access TR systems are more robust than traditional closed access networks, such as those using the 802.11 protocols described above.

Figure 10:
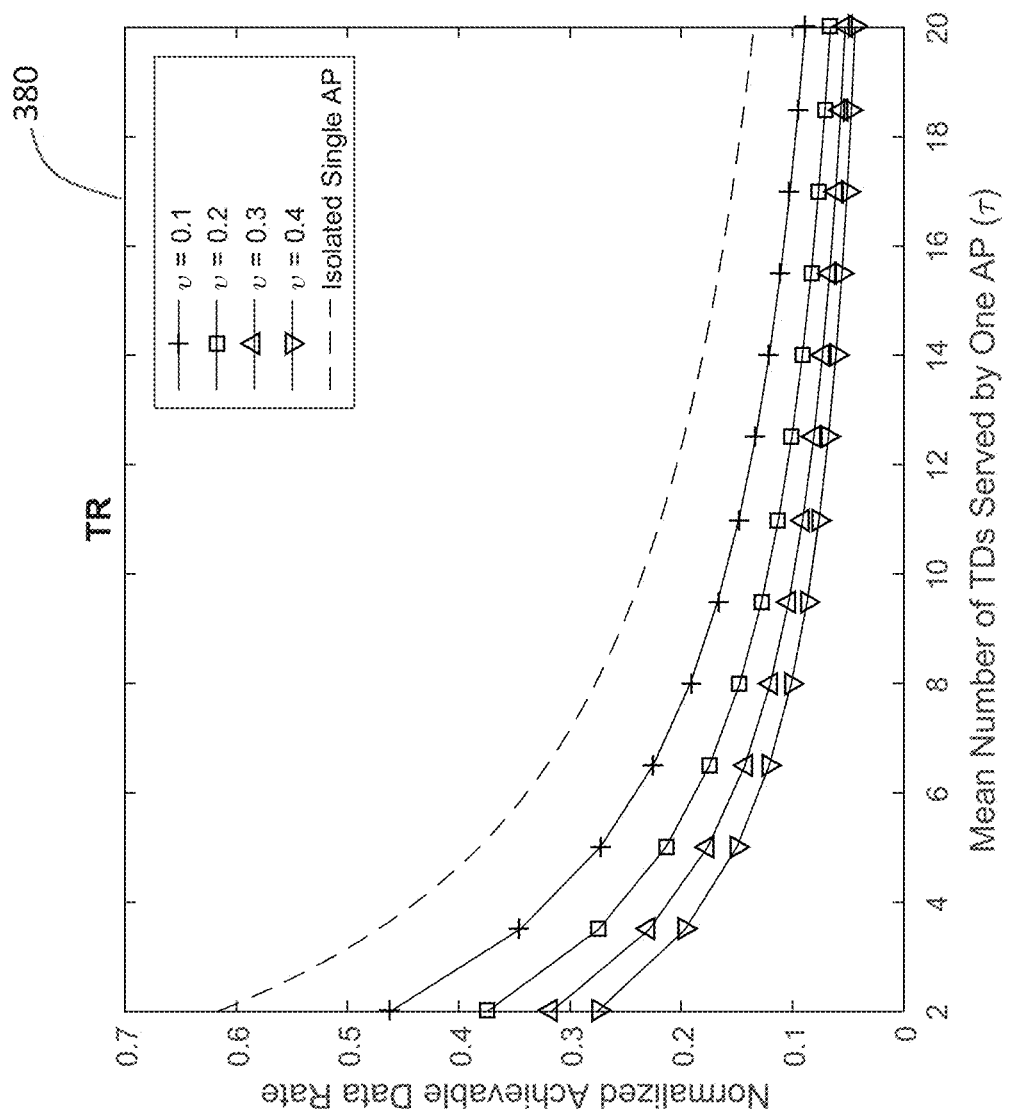
FIG. 10 shows the normalized achievable data rate as a function of the mean number of TDs served by one AP in a TR communication system for various values of AP densities, $\upsilon$.

We investigate the achievable data rate of each individual TD versus the density of APs in both closed access TR systems and traditional wireless networks. The achievable data rate of a TD should be highest when there are no other interfering APs within range, and will decrease as more APs are placed nearby. To understand the effect of the nearby APs, we define a normalized achievable data rate, which is the ratio of the effective achievable data rate and the point to point link capacity. This quantity characterizes the extent to which the achievable data rate degrades due to the interference from other devices sharing the transmission medium. FIG. 10 is a graph 380 that shows the modeling results for a closed access TR system. Note that for each value of the mean number of TDs served by one AP, τ, the achievable data rate for a single TD is reduced as the density of APs increases. Note too that the normalized achievable data rate never exceeds that achieved by the single AP case where there is no ICI.

Historically, the 802.11 wireless technology was designed to work well within the single cell case to extend coverage. However, as the number of TDs increases, the coverage areas must be made smaller to support multiple cells and the data signals received by individual TDs in this dense network scenario can be severely affected by the nearby closed access APs. To model this behavior, we first observe that when multiple 802.11 TDs are served by one 802.11 AP, the average active time of one TD is upper bounded by 1/n where n is the number of TDs. Moreover, when multiple APs are within the range of each other, the average on-time of each AP is upper bounded by 1/Z where Z is the number of APs. Therefore, for an IEEE 802.11 based TD in a service group where there are n TDs and the AP is in range of Z−1 other APs, the average active time of any of the APs is upper bounded by 1/(nZ) and the effective achievable data rate U is G/(nZ) where G is the point to point link capacity. The expected value of U could be expressed as $$E[U] = E\left[\frac{1}{nZ} \cdot G\right] = \frac{1-e^{\tau}}{\tau} \cdot \frac{1-e^{A\upsilon}}{A\upsilon} G \qquad (31)$$

where A is the interference area. In this work, A is set to be $\pi \cdot 3.16^2$ m$^2$ which corresponds to the path loss model for IEEE 802.11 channels in 2.4 GHz in the indoor environment and SNR being 20 dB.

Figure 11:
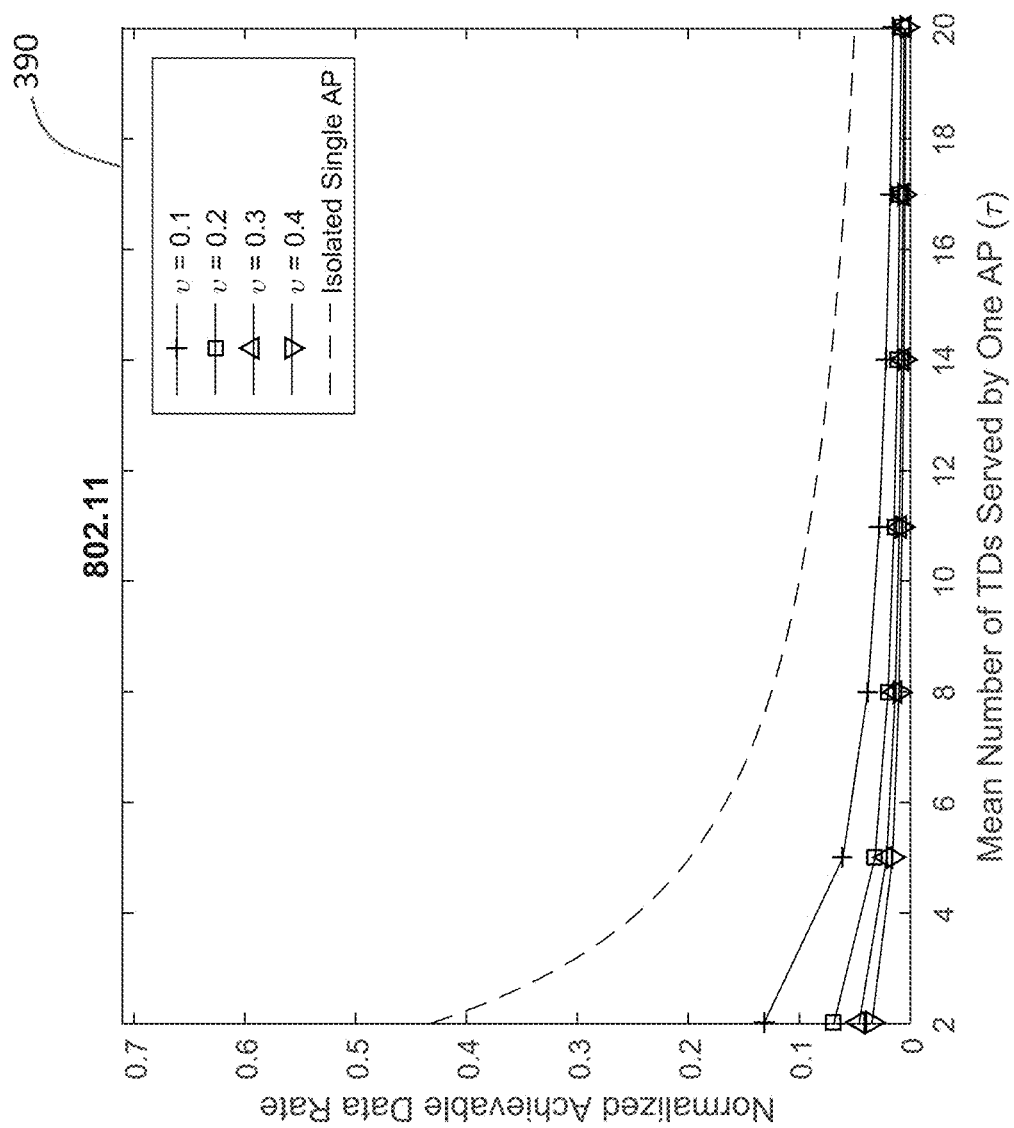
FIG. 11 shows the normalized achievable data rate as a function of the mean number of TDs served by one AP in an 802.11 communication system for various values of AP densities, $\upsilon$.

As shown in a graph 390 in FIG. 11, the degradation of the achievable data rate in the IEEE 802.11 based system is significant compared with the isolated single AP scenario, even when the AP density is low ($\upsilon$=0.1). This limitation results from each link requiring exclusive use of the channel, which is inefficient if there are many devices close to each other in a network. In contrast, the TR-based downlink system can tolerate interference so that multiple APs can share the spectrum. Due to the interference mitigation effect of TR-based communications, the influence of ICI is much reduced. As shown in the graph 380 of FIG. 10, the degradation of the data rate is more graceful, and each device is more robust against the interference from nearby closed access APs.

In addition to the achievable data rate, another important issue is the latency, i.e., the delay for delivering a packet. In an exemplary embodiment, TRs system can be shown to be capable of delivering packets with minimal delay compared to traditional WiFi systems.

In this disclosure, we describe a two-layer model to evaluate the packet delay in the TRDMA system. The TRDMA protocol is run in the physical layer model to simulate the bit error rate (BER), which is transferred to the media access control (MAC) layer model which may introduce further packet delay. The delay of a packet is defined as the duration of time from the moment that it is at the head of the MAC queue until the time that the acknowledgement (ACK) packet is received. In the TR system, since the transmission of a packet does not depend on the behavior of other devices, the packet on the AP side is transmitted at the moment when it is ready, and the TD can start to transmit the ACK packet upon completing the validation of the received data. Therefore, in this system, the delay for the packet is the time needed for transmission as well as repeated re-transmissions in case of any bit errors. The expected delay of a packet can be represented by $$\text{delay} = \frac{T_{pac}}{1-PER} \qquad (32)$$

where $T_{pac}$ is the time needed for the AP to complete the transmission of a packet, PER=1−(1−BER)$^{L_p}$ is the packet error rate and L, is the packet length. The parameters of the packet that have been used in the simulation scenarios are listed in Table 2. Note that any exemplary parameters used in this simulation that were also used in the simulations summarized in Table 1 are the same, so results of both simulations may be fairly compared.

Note that many commercially available WiFi components and interfaces operate with frequency ranges in or near the Industrial, Scientific, and Medical (ISM) bands of 2.4 GHz and 5.8 GHz. The exemplary components, methods, and techniques disclosed herein may operate in these same spectral regions and may operate simultaneously with such traditional WiFi equipment. While near-term deployments of this technology may take advantage of commercially available components that operate in these regions of the electromagnetic spectrum, the techniques described herein are general and can be implemented by equipment with different carrier frequencies, center frequencies, spectral bandwidths and the like. For example, these inventions may operate in spectral bands associated with the so-called WiFi and Ultrawideband IEEE standards (e.g., 2.4 to 2.5 GHz, 5.725 to 5.875 GHz, 250 to 750 MHz, 3.244 to 4.742 GHz, 5.944 to 10.235 MHz), as well as typical cellular (e.g., 700 mHz to 3.5 GHz), and radio broadcast frequency ranges (e.g., 100 kHz to 900 MHz).

TABLE 2

Packet and Link Parameters

| Parameter | Value |
| --- | --- |
| Packet Payload | 8184 bits |
| MAC header | 224 bits |
| PHY header | 192 bits |
| ACK packet | 112 bits + PHY header |
| Channel bit rate | 1 Mb/s |

Figure 12:
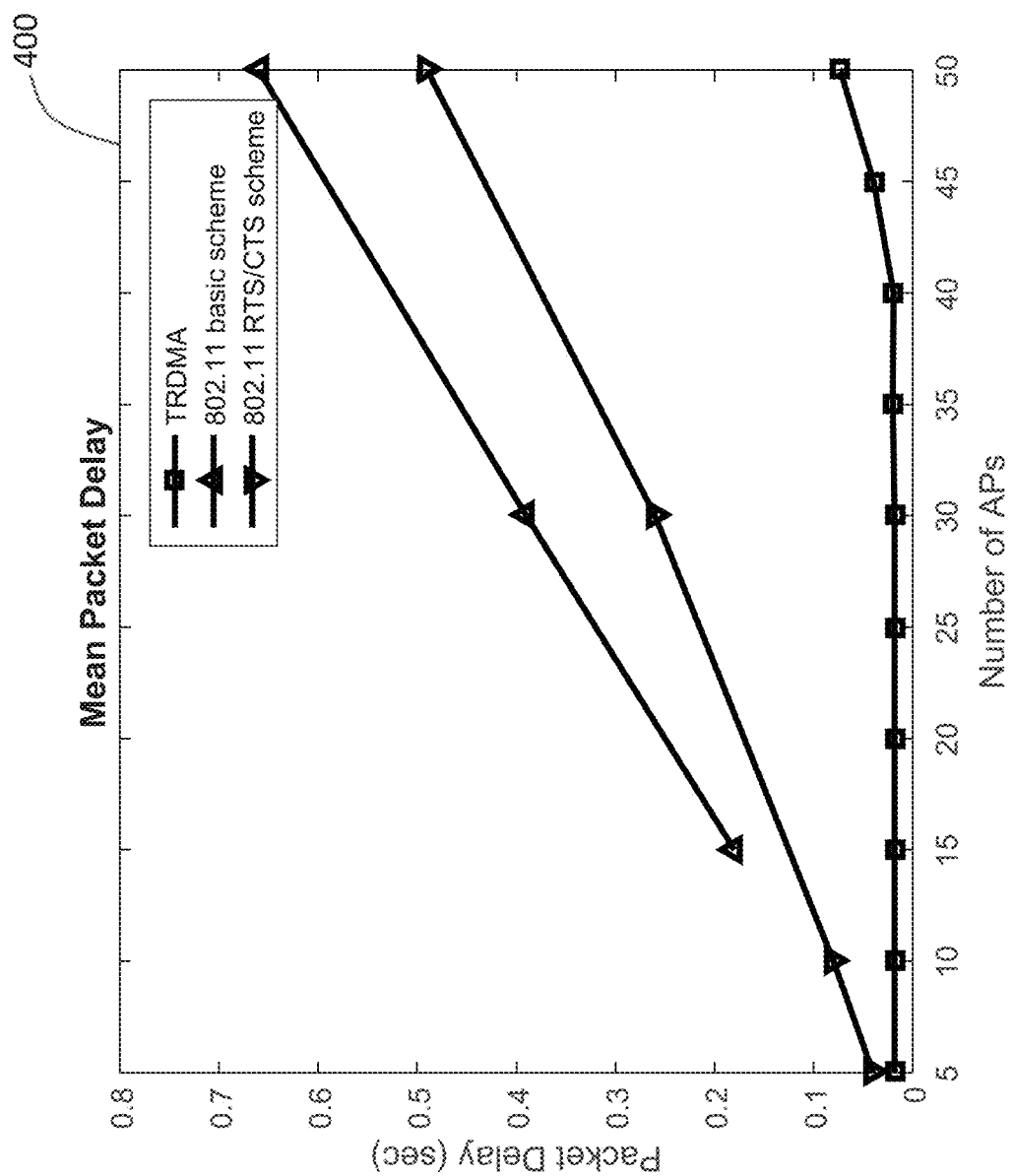
FIG. 12 shows the modeled packet delay as a function of the number of APs in a closed access system when the physical layer protocols are TRDMA, basic 802.11 and RTS/CTS (request to send/clear to send) 802.11.

FIG. 12 is a graph 400 that shows the mean packet delay of the TR system obtained by (32) and the mean packet delay of IEEE 802.11 base systems obtained from "IEEE 802.11 Packet Delay-A Finite Retry Limit Analysis", P. Chatzimisios, A. Boucouvalas, and V. Vitsas, IEEE Proc. Of GLOBECOMM '03, pp. 950-954, vol. 2, (2003). The graph 400 of FIG. 12 shows that the delay of a packet in the TR system is almost constant with the increasing number of APs. This feature may be highly desirable in wireless communications systems since the quality of service (QoS) of each individual TD can be preserved when the system scales up. This advantage results at least partially from all the APs and TDs being able to share the wireless medium rather than requiring exclusive use, and consequently the transmission of a packet does not have to wait. Moreover, additional APs would only contribute to the ICI of the intended receiver which is mitigated by the spatial and temporal focusing effect of the TR scheme, and thus the influence of additional APs is minimal. On the other hand, in the IEEE 802.11 based system, due to the DCF that is used to coordinate multiple devices, each device may need to go through the back off stages before a packet is allowed to be transmitted, where the number of back off stages grows with the number of other devices around. As a result, this mechanism is not expected to be efficient and the delay of a packet may grow approximately linearly with the system size.

Figure 13:
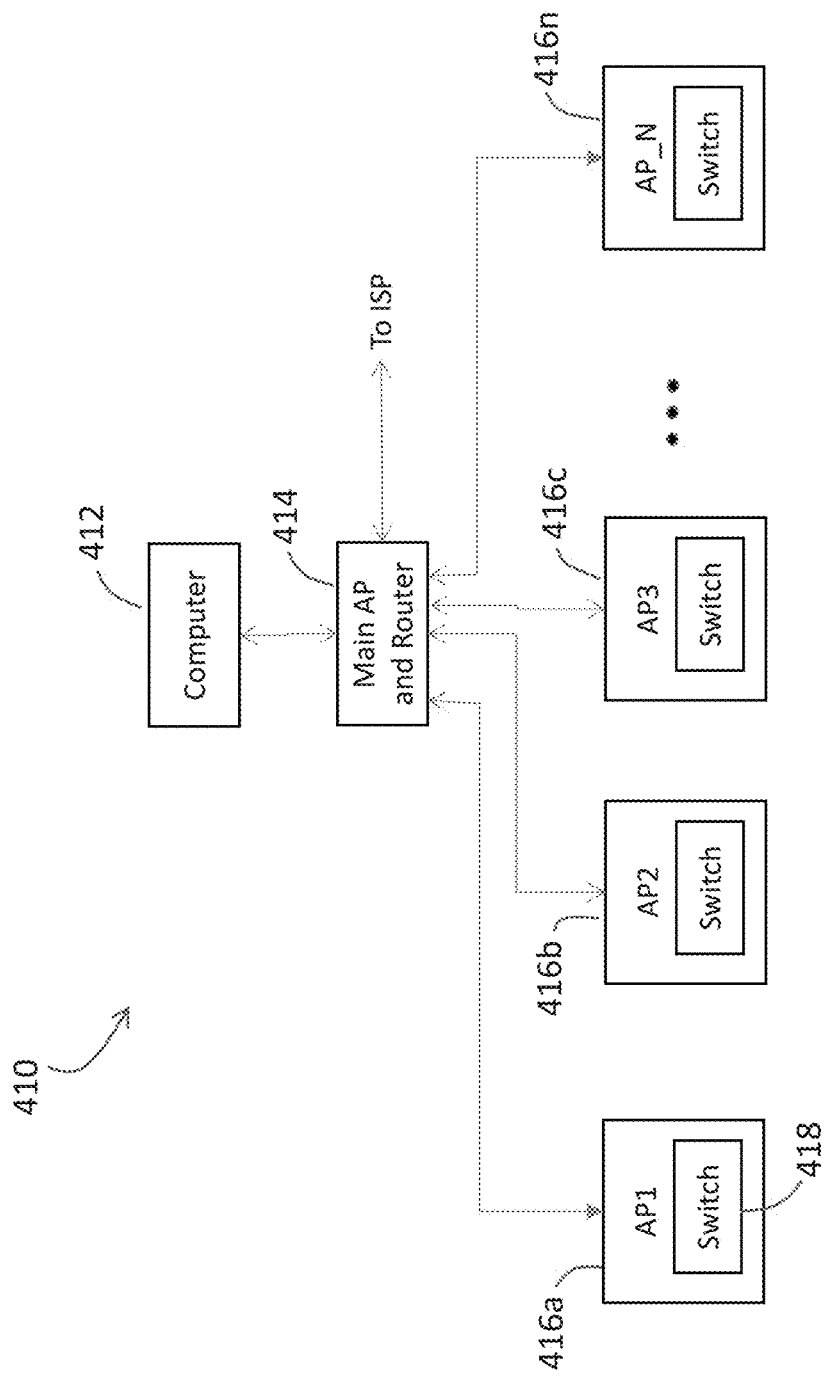
FIG. 13 is a diagram of a TRDMA system.

In some implementations, referring to FIG. 13, a system 410 includes a main access point and router 414 that communicates with an Internet service provider, e.g., through a wired connection such as a cable network or an optical fiber network. The main access point and router 414 is connected to several access points, such as a first access point 416a, a second access point 416b, a third access point 416c, . . . , and an n-th access point 416n. The access points 416a to 416n communicate with terminal devices (not shown in the figure) using the TRDMA protocol. The access points 416a to 416n may also communicate with the terminal devices using other communication protocols (e.g., IEEE 802.11 and/or Bluetooth) in addition to the TRDMA protocol. Each of the access points 416a to 416n has a switch 418 that switches the access point between an ON mode and a sleep mode (or power saving mode). In the sleep mode, portions of the circuitry in the access point are powered off or enter a low power state. For example, the switch 418 may turn on or off the power to portions of the circuitry in the access point. The main access point and router 414 communicates with a computer 412 that controls the operation modes of the access points 416a to 416n. The computer 412 also provides a user interface to enable a user or operator to configure the system 410.

For example, the system 410 may be deployed in a household that has many electronic devices that from time to time require connection to the home network or the Internet. During night time, when the household members are asleep and many of the devices are powered off, the demand for network bandwidth is low, so only the first access point 416a is in the ON mode while the other access points 416b to 416n are in the sleep mode. The first access point 416a may provide network connection to devices that are operational during the night, such as smart thermostats, smoke detectors, home security monitors, and digital video recorders.

For example, in the morning, when family members wake up and power up devices such as fitness trackers, mobile phones, and laptop computers, more bandwidth is required, so the computer 412 configures additional access points (e.g., by controlling the switches 418), such as the second access point 416b and/or the third accesspoint 416c, to cause them to switch from the sleep mode to the ON mode. For example, when the family members leave the house, the network bandwidth requirement may be reduced, so the computer 412 configures the second access point 416b and/or the third accesspoint 416c to cause them to switch from the ON mode to the sleep mode. For example, early in the evening, when the family members return to the house, the network bandwidth requirement increases to a peak load, so the computer 412 configures all the access points 416b to 416n to cause them to switch from the sleep mode to the ON mode. For example, late in the evening, when the household members go to sleep, the demand for network bandwidth is reduced, so the computer 412 configures the access points 416b to 416n to switch from the ON mode to the sleep mode, leaving only the first access point 416a in the ON mode. The computer 412 may dynamically switch the access points 416 between ON mode and sleep mode based on, e.g., required data bandwidth or other feedback signals. The system 410 is highly scalable and can accommodate different user densities.

In the system 410, the access points 416 use the TRDMA protocol to communicate with the terminal devices, the time-reversal focusing effects generate natural spatial multiplexing of the signals among the terminal devices, thus reducing interference with each other. The user may install the access points 416 at various locations in the house, the user may move the access points 416 from time to time, and the computer 412 does not need to know where the access points 416 are positioned. This makes the installation of the access points convenient. In some examples, the computer 412 does not need to perform spectrum planning when turning on additional access points 416. Each of the access points 416 may use the full spectrum available to the access points 416. In some examples, different access points 416 may use different frequency bands, but the frequency bands may overlap one another.

For example, the distance between two wireless access points may be, e.g., less than 3 meters, less than 10 meters, or less than 100 meters. For example, each of the wireless access points may use a frequency band having a bandwidth that is greater than, e.g., 10 MHz, 20 MHz, 40 MHz, 70 MHz, or 125 MHz. For example, the first wireless access point may use a first frequency band, the second wireless access point may use a second frequency band, and the overlap between the first and second frequency bands may be, e.g., at least 1 MHz, at least 5 MHz, at least 10 MHz, at least ¼ of the bandwidth of the first frequency band, at least ½ of the bandwidth of the first frequency band, or at least ¾ of the bandwidth of the first frequency band. For example, the entire first frequency band may overlap the second frequency band.

The system 410 can be installed in, e.g., office buildings, shopping malls, airports, and convention centers, where the number of users changes significantly over time in the course of a day. By using access points that employ the TRDMA protocol, the data bandwidth needs of a large number of users can be satisfied by dynamically turning on access points when needed, while achieving power conservation by switching the access points to sleep mode when the bandwidth requirement is reduced. Furthermore, by using TRDMA protocols, multiple access points within range of each other may be turned on and off, and may channel hop to satisfy system data demand requirements, without coordinating their operating frequencies and/or bandwidths with each other.

In some implementations, multiple access points may be deployed in a venue, and one of the access points may be configured to monitor system and/or network conditions and activate or deactivate other access points depending on the system and/or network conditions. For example, a first access point may be continuously in the ON mode. The first access point may monitor the data rate of the downlink signals transmitted from the first access point, and/or the uplink signals received at the first access point. If the data rate is below a first predetermined threshold, the first access point may activate a second access point to increase the network bandwidth. As shown in FIGS. 7-10, when TRDMA protocol is used, increasing the number of active access points may increase the achievable data rate.

The first access point continues to monitor the data rate of the uplink and/or downlink signals. If the data rate decreases above the first predetermined threshold, the first access point may activate a third access point to increase the network bandwidth, and so forth. If the data rate increases above a second predetermined threshold, the first access point may deactivate the third access point to conserve power. If the data rate continues to be above the second predetermined threshold, the first access point may deactivate the second access point to conserve power. In the above examples, the first access point may communicate with the second and third access points to determine the data rates achieved at the second and third access points.

A number of parameters can be used to determine whether access points are activated or deactivated. For example, the first access point may monitor the quality of service (QoS) parameter, if the QoS falls below a first predetermined threshold, the first access point may activate the second and/or third access point, and so forth. If the QoS increases above a second predetermined threshold, the first access point may de-activate the second and/or third access point, and so forth. Some terminal devices may request guaranteed bandwidths. For example, a terminal device may stream a high definition video and need a certain guaranteed data bandwidth to avoid interruption of the video stream. The first access point may activate additional access points to support the required bandwidths requested by the terminal devices and/or other terminal devices. When the data bandwidth requested by the terminal devices is reduced (e.g., when the video streaming ends), the first access point may de-activate some of the other access points.

In some implementations, the first access point may monitor its power consumption and when the power consumption is greater than a first predetermined threshold, activate the second access point to reduce the network load at the first access point. When the power consumption at the first access point falls below a second predetermined threshold, the first access point may de-activate the second access point.

In some implementations, several access points may be capable of monitoring system and/or network parameters during sleep mode and activate itself and switch to ON mode when the system and/or network parameters meet certain certeria. For example, the second access point may have a monitor module that monitors the data rate, QoS, or required bandwidth while the second access point is in the sleep mode, and activates itself to the ON mode when the data rate falls below a threshold, the QoS falls below a threshold, or the required bandwidth is greater than the current available bandwidth. For example, the monitor module of the second access point may communicate with the first access point or other activated access points to obtain information about the data rate, QoS, required data bandwidth, and/or available data bandwidth, etc. The second access point can be configured to de-activate itself when it determines that it is no longer needed to support the required data rate, QoS, and/or bandwidth.

In this disclosure we described a TR-based multiple AP downlink system to tackle the high network densification challenge. Due to the natural focusing effects of TR communications, the interference may be automatically mitigated without any coordination among APs. As a result, a TR based wireless communication system is highly scalable without the need for coordination amongst multiple APs. The achievable data rate of the TR system was investigated under both an open access model where each AP is open to any TD, and a closed access model where each AP is only open to specific TDs. Results of numerical simulations show that the TR system is scalable in the open access model where the system could be extended to serve more devices and/or higher data rate, and is failure-robust in the closed access model where the data rate degradation caused by nearby closed access APs is more graceful than the IEEE 802.11 based system. The results also show that the packet delay in the TR system is much lower than that in the IEEE 802.11 based system. These results show that the TR-based components, technologies, systems and protocols described above can meet the predicted traffic demands of the very dense networks of the future.

In some implementations, the access points 102, 230, 302, 414, 416, terminal devices 104, and the computer 412 can include one or more processors and one or more computer-readable mediums (e.g., RAM, ROM, SDRAM, hard disk, optical disk, and flash memory). The one or more processors can perform various calculations described above. The calculations can also be implemented using application-specific integrated circuits (ASICs). The calculations can also be implemented in remote computing resources such as remote computers and cloud computing resources. The term "computer-readable medium" refers to a medium that participates in providing instructions to a processor for execution, including without limitation, non-volatile media (e.g., optical or magnetic disks), and volatile media (e.g., memory) and transmission media. Transmission media includes, without limitation, coaxial cables, copper wire, fiber optics and free space.

The features described above can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims.

What is claimed is:

1. A wireless access point, comprising:
   a wireless transmitter;
   an activation switch configured to be dynamically activated or deactivated in response to at least one of required bandwidth, available bandwidth, device count, quality of service (QoS), power consumption, or a feedback signal derived from processing of an uplink data signal; and
   a processor that is configured to: (a) enter an activation mode upon activation of the activation switch, and (b) generate designed waveforms, and generate downlink waveforms based on a combination of the designed waveforms and downlink data in the activation mode, such that the downlink waveforms are spatially focused at intended receivers;
   wherein the wireless transmitter transmits the downlink waveforms to the receivers;
   wherein each designed waveform is associated with a particular receiver, the designed waveform is designed based on information about characteristics of a multipath channel between the wireless transmitter and the particular receiver, and a downlink waveform that is generated based on the designed waveform and downlink data intended for the particular receiver is spatially focused at the particular receiver; and
   wherein the wireless transmitter transmits in a first frequency band that overlaps a second frequency band of a neighboring access point.

2. The wireless access point of claim 1 wherein the neighboring access point is less than three meters away.

3. The wireless access point of claim 1 wherein the neighboring access point is less than 10 meters away.

4. The wireless access point of claim 1 wherein the neighboring access point is less than 100 meters away.

5. The wireless access point of claim 1 wherein the first frequency band is greater than 20 MHz.

6. The wireless access point of claim 1 wherein an overlap between the first frequency band and the second frequency band is at least 5 MHz.

7. The wireless access point of claim 1 wherein the first frequency band is greater than 40 MHz.

8. The wireless access point of claim 1 wherein the first frequency band is greater than 70 MHz.

9. The wireless access point of claim 1 wherein the first frequency band is greater than 125 MHz.

10. The wireless access point of claim 1 wherein the first frequency band has a center frequency that is approximately 2.4 GHz.

11. The wireless access point of claim 1 wherein the first frequency band has a center frequency that is approximately 5.8 GHz.

12. The wireless access point of claim 1 in which the designed waveform associated with the particular receiver is designed based on a probe signal sent from the particular receiver to the wireless access point.

13. The wireless access point of claim 1 in which the processor is configured to use a control signal to control the activation or the deactivation of the first activation switch.

14. The wireless access point of claim 1 in which the wireless access point is configured to monitor at least one of a system parameter or a network parameter during sleep mode and activate itself and switch to ON mode when at least one of the system parameter or the network parameter meets a criterion.

15. A first wireless access point, comprising:
    a wireless receiver for receiving wireless channel probe signals and uplink data signals;
    a first activation switch configured to dynamically activate or deactivate a first wireless access point or a circuit in the first wireless access point in response to at least one of required bandwidth, available bandwidth, device count, quality of service (QoS), power consumption, or a feedback signal derived from processing of an uplink data signal;
    a processor that is configured to (a) determine channel response estimates from the wireless channel probe signals and process the uplink data signals to configure a control signal based on the uplink data signals, (b) enter an activation mode upon activation of the activation switch, (c) generate designed waveforms, and (d) generate downlink waveforms based on a combination of the designed waveforms and downlink data in the activation mode such that the downlink waveforms are spatially focused at intended receivers; and
    a wireless transmitter for transmitting the downlink waveforms to the receivers;
    wherein each designed waveform is associated with a particular intended receiver, the designed waveform is designed based on information about characteristics of a multipath channel between the wireless transmitter and the particular receiver, and a downlink waveform that is generated based on the designed waveform and downlink data intended for the particular receiver is spatially focused at the particular receiver,
    wherein the wireless transmitter transmits in a first frequency band that overlaps a second frequency band of a neighboring access point, and
    wherein the processor is configured to communicate the control signal to a second activation switch of a second wireless access point to activate or deactivate the second wireless access point.

16. The wireless access point of claim 15 wherein the processor is configured to determine a data rate based on the uplink data signals, and configure the control signal based on a comparison of the data rate and a reference value.

17. The wireless access point of claim 15 wherein the processor is configured to generate the control signal based on a feedback signal derived from the processing of the uplink data signals, the feedback signal having information about one or more characteristics of at least one of an uplink channel or a downlink channel.

18. The wireless access point of claim 17 wherein the one or more characteristics comprise at least one of a data rate, a quality of service, or a required bandwidth.

19. The wireless access point of claim 15 in which the processor is configured to determine at least one of a data rate or quality of service based on the uplink data signals, compare the data rate or the quality of service with a reference value, and perform at least one of (i) activate or deactivate the wireless access point or a circuit in the wireless access point, or (ii) activate or deactivate the other wireless access point or a circuit in the other wireless access point, based on the comparison of the data rate or the quality of service and the reference value.

20. The wireless access point of claim 15 wherein the processor is configured to perform at least one of (i) activate or deactivate the wireless access point or a circuit in the wireless access point, or (ii) activate or deactivate the other wireless access point or a circuit in the other wireless access point, based on a comparison of an amount of power consumed by the access point with a reference value.

21. The wireless access point of claim 15 wherein the process is configured to activate or de-activate the wireless access point or a circuit in the wireless access point based on data signals that are generated by an app executing on a terminal device.

22. The wireless access point of claim 15 in which when the wireless access point or the circuit in the wireless access point is de-activated, the wireless access point stops transmitting downlink data signals.

23. The wireless access point of claim 15 in which the processor is configured to use the control signal to control the first activation switch of the first wireless access point or the second activation switch of the second access point, during a first time period the processor activates the first wireless access point and deactivates the second access point, during a second time period the processor deactivates the first wireless access point and activates the second access point, and during a third time period the process activates both the first wireless access point and the second access point.

24. A wireless access point, comprising:
a wireless transmitter;
an activation switch configured to be dynamically activated or deactivated in response to at least one of required bandwidth, available bandwidth, device count, quality of service (QoS), power consumption, or a feedback signal derived from processing of an uplink data signal; and
a processor that is configured to (a) enter an activation mode upon activation of the activation switch, and (b) generate designed waveforms, and generate downlink waveforms based on a combination of the designed waveforms and downlink data in the activation mode, such that the downlink waveforms are spatially and temporally focused at intended receivers;
wherein the wireless transmitter transmits the downlink waveforms to the receivers;
wherein each designed waveform is associated with a particular receiver, the designed waveform is designed based on information about characteristics of a multipath channel between the wireless transmitter and the particular receiver, and a downlink waveform that is generated based on the designed waveform and downlink data intended for the particular receiver is spatially and temporally focused at the particular receiver; and
wherein the wireless transmitter transmits in a first frequency band that overlaps a second frequency band of a closest neighboring access point.

25. The wireless access point of claim 24, wherein at least half of the first frequency band overlaps the second frequency band.

26. The wireless access point of claim 24, in which the designed waveform associated with the particular receiver is designed based on a probe signal sent from the particular receiver to the wireless access point.

27. The wireless access point of claim 24 in which the processor is configured to use a control signal to control the activation or the deactivation of the first activation switch.

28. The wireless access point of claim 24 in which the wireless access point is configured to monitor at least one of a system parameter or a network parameter during sleep mode and activate itself and switch to ON mode when at least one of the system parameter or the network parameter meets a criterion.

* * * * *